(12) United States Patent
Huang et al.

(10) Patent No.: US 12,434,596 B2
(45) Date of Patent: Oct. 7, 2025

(54) METHOD FOR CHARGING TRACTION BATTERY AND BATTERY MANAGEMENT SYSTEM

(71) Applicant: CONTEMPORARY AMPEREX TECHNOLOGY (HONG KONG) LIMITED, Hong Kong (CN)

(72) Inventors: Shan Huang, Ningde (CN); Shichao Li, Ningde (CN); Haili Li, Ningde (CN); Wei Zhao, Ningde (CN); Lan Xie, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/458,164

(22) Filed: Aug. 30, 2023

(65) Prior Publication Data

US 2023/0398902 A1 Dec. 14, 2023

Related U.S. Application Data

(63) Continuation of application No. PCT/CN2021/117310, filed on Sep. 8, 2021.

(51) Int. Cl.
*B60L 58/16* (2019.01)
*B60L 53/62* (2019.01)
(Continued)

(52) U.S. Cl.
CPC ............. *B60L 58/16* (2019.02); *B60L 53/62* (2019.02); *B60L 58/13* (2019.02); *H02J 7/0029* (2013.01);
(Continued)

(58) Field of Classification Search
CPC ....... H02J 7/005; H02J 7/00714; B60L 58/16; B60L 53/62; B60L 58/13
(Continued)

(56) References Cited

U.S. PATENT DOCUMENTS

| 6,747,371 B2 * | 6/2004 | Kotlow | H02J 7/0049 307/66 |
| 7,830,126 B2 * | 11/2010 | Kawahara | H02J 7/0031 320/160 |

(Continued)

FOREIGN PATENT DOCUMENTS

| CN | 102208699 A | 10/2011 |
| CN | 104269583 A | 10/2011 |

(Continued)

OTHER PUBLICATIONS

The international search report received in the corresponding international application PCT/CN2021/117310, mailed May 27, 2022.
(Continued)

*Primary Examiner* — John T Trischler
(74) *Attorney, Agent, or Firm* — K&L Gates LLP

(57) ABSTRACT

Provided are a method for charging a traction battery and a battery management system. The method for charging the traction battery is applied to a battery management system, where the method includes: obtaining an SOH of the traction battery; in a charging process of the traction battery, obtaining an SOC of the traction battery; determining an SOC interval value corresponding to discharging or stopping being charged of the traction battery based on the SOH of the traction battery; and when the SOC of the traction battery changes by the SOC interval value, controlling the traction battery to discharge or stop being charged. Through the technical solution, in the charging process of the traction battery, the discharging or the stopping being charged of the traction battery can be controlled to reduce the risk of
(Continued)

lithium precipitation in the traction battery and improve the safety performance of the traction battery.

15 Claims, 7 Drawing Sheets

(51) Int. Cl.
| | |
|---|---|
| *B60L 58/12* | (2019.01) |
| *B60L 58/13* | (2019.01) |
| *G01R 31/367* | (2019.01) |
| *H02J 7/00* | (2006.01) |
| *G01R 31/392* | (2019.01) |
| *H01M 10/42* | (2006.01) |

(52) U.S. Cl.
CPC ............ *H02J 7/005* (2020.01); *H02J 7/0071* (2020.01); *H02J 7/00714* (2020.01); *B60L 58/12* (2019.02); *B60L 2240/549* (2013.01); *G01R 31/367* (2019.01); *G01R 31/392* (2019.01); *H01M 2010/4271* (2013.01); *H02J 7/0048* (2020.01); *H02J 7/0049* (2020.01)

(58) Field of Classification Search
USPC ...................................................... 320/134
See application file for complete search history.

(56) References Cited

U.S. PATENT DOCUMENTS

| | | | | |
|---|---|---|---|---|
| 7,928,598 B2* | 4/2011 | King | ........................ | B60L 55/00 307/9.1 |
| 8,154,151 B2* | 4/2012 | King | ........................ | B60L 58/13 307/9.1 |
| 8,368,357 B2* | 2/2013 | Ghantous | ............. | H02J 7/00711 320/157 |
| 8,629,657 B2* | 1/2014 | Kishiyama | .............. | B60L 53/11 320/132 |
| 8,648,603 B2* | 2/2014 | Harada | ................ | G01R 31/392 324/425 |
| 8,798,833 B2* | 8/2014 | Kusumi | .................. | B60L 58/21 701/22 |
| 8,820,446 B2* | 9/2014 | Kusumi | .................. | B60L 58/12 320/134 |
| 8,996,241 B2* | 3/2015 | Uchida | ............... | H01M 10/425 701/29.6 |
| 9,343,920 B2* | 5/2016 | Shibata | .................. | B60L 58/13 |
| 9,588,186 B2* | 3/2017 | Arnold | ................ | G01R 31/392 |
| 9,711,976 B2* | 7/2017 | Abe | .................... | H01M 10/486 |
| 9,766,298 B2* | 9/2017 | Lennevi | ................ | G01R 31/382 |
| 9,793,736 B2* | 10/2017 | Luo | ....................... | H02J 7/00711 |
| 9,935,465 B2* | 4/2018 | Inoue | ........................ | H02J 3/40 |
| 10,011,187 B2* | 7/2018 | Cha | .......................... | G07C 5/06 |
| 10,116,147 B2 | 10/2018 | Kawamura et al. | | |
| 10,128,677 B2* | 11/2018 | Tian | .......................... | H02J 7/04 |
| 10,160,340 B2* | 12/2018 | Lindemann | ............. | B60L 58/16 |
| 10,164,456 B2* | 12/2018 | Luo | .................... | H01M 10/0525 |
| 10,209,320 B2* | 2/2019 | Cha | ........................ | H01M 4/525 |
| 10,222,428 B2* | 3/2019 | Saint-Marcoux | .... | G01R 31/392 |
| 10,279,700 B2* | 5/2019 | Takebayashi | ........... | B60L 58/13 |
| 10,291,046 B2* | 5/2019 | Ravi | ....................... | H02J 7/0045 |
| 10,310,020 B2* | 6/2019 | Biletska | ................ | G01R 31/387 |
| 10,355,509 B2* | 7/2019 | Sada | ........................ | H02J 3/003 |
| 10,389,151 B2* | 8/2019 | Ravi | ....................... | H02J 7/007 |
| 10,408,887 B2* | 9/2019 | Shimizu | ................ | G01R 31/392 |
| 10,444,290 B2* | 10/2019 | Kawamura | .................. | B60L 58/20 |
| 10,447,054 B2* | 10/2019 | Christensen | ........ | H01M 10/425 |
| 10,449,870 B2* | 10/2019 | Chang | .................. | B60L 50/60 |
| 10,459,035 B2* | 10/2019 | Takemura | .......... | H01M 10/0525 |
| 10,500,970 B2* | 12/2019 | Kawamura | .............. | H01M 10/48 |
| 10,547,196 B2* | 1/2020 | Jung | ...................... | H02J 7/00714 |
| 10,620,273 B2* | 4/2020 | Tang | ................ | G01R 31/3646 |
| 10,998,752 B2* | 5/2021 | Jung | ................... | H02J 7/007182 |
| 11,025,071 B2* | 6/2021 | Yamada | ............... | A24B 15/167 |
| 11,047,918 B2* | 6/2021 | Du | ..................... | H01M 10/4257 |
| 11,262,406 B2* | 3/2022 | Du | ........................ | G01R 31/396 |
| 11,366,172 B2* | 6/2022 | Choi | ..................... | G01R 31/389 |
| 11,381,094 B2* | 7/2022 | Park | ....................... | H02J 7/0024 |
| 11,404,896 B2* | 8/2022 | Du | ..................... | H02J 7/007188 |
| 11,437,838 B2* | 9/2022 | Du | ......................... | H02J 7/0048 |
| 11,448,707 B2* | 9/2022 | Sada | ..................... | G01R 31/392 |
| 11,462,780 B2* | 10/2022 | Fujita | ....................... | H02J 7/007 |
| 11,486,934 B2* | 11/2022 | Tang | .................. | G01R 31/3648 |
| 11,502,530 B2* | 11/2022 | Hayayama | .......... | H01M 10/486 |
| 11,506,715 B2* | 11/2022 | Song | ..................... | G01R 19/10 |
| 11,609,276 B2* | 3/2023 | Ruan | .................... | G01R 31/392 |
| 11,619,679 B2* | 4/2023 | Ruan | .................... | G01R 31/385 702/63 |
| 11,656,289 B2* | 5/2023 | Du | ..................... | G01R 31/3648 702/63 |
| 11,742,531 B2* | 8/2023 | Zhu | ....................... | H02J 7/0068 320/130 |
| 11,796,596 B2* | 10/2023 | Choi | ...................... | H01M 10/44 |
| 11,824,379 B2* | 11/2023 | Yamada | .................. | A24F 40/50 |
| 11,835,587 B2* | 12/2023 | Du | ........................ | G01R 31/392 |
| 11,862,997 B2* | 1/2024 | Yamada | ................. | H02J 9/005 |
| 11,870,289 B2* | 1/2024 | Huang | ................... | B60L 58/13 |
| 11,909,244 B2* | 2/2024 | Li | .......................... | H01M 4/587 |
| 11,933,851 B2* | 3/2024 | Hyun | ................. | G01R 31/3648 |
| 11,993,173 B2* | 5/2024 | Khaja | ..................... | B60L 58/16 |
| 12,046,928 B2* | 7/2024 | Yamada | ................ | H02J 7/0047 |
| 12,092,697 B2* | 9/2024 | Jung | ..................... | H01M 10/48 |
| 2003/0197484 A1* | 10/2003 | Kotlow | ...................... | H02J 7/14 320/104 |
| 2007/0247106 A1* | 10/2007 | Kawahara | ............... | B60L 58/22 320/104 |
| 2010/0253145 A1* | 10/2010 | King | ....................... | B60L 50/40 307/46 |
| 2011/0156652 A1* | 6/2011 | Kishiyama | ............. | B60L 58/15 320/132 |
| 2011/0175442 A1* | 7/2011 | King | ....................... | B60L 50/40 307/9.1 |
| 2011/0218703 A1* | 9/2011 | Uchida | .................... | B60L 58/12 701/31.4 |
| 2011/0316548 A1* | 12/2011 | Ghantous | ............ | H01M 50/569 324/427 |
| 2012/0283903 A1* | 11/2012 | Kusumi | .................... | B60L 3/12 701/22 |
| 2013/0035813 A1* | 2/2013 | Kusumi | ................ | B60W 10/26 701/22 |
| 2013/0038333 A1* | 2/2013 | Harada | ............... | H01M 10/486 324/431 |
| 2013/0113433 A1* | 5/2013 | Shibata | .................... | G01R 31/392 320/134 |
| 2013/0257382 A1* | 10/2013 | Field | ........................ | H02J 7/0071 320/136 |
| 2014/0095092 A1* | 4/2014 | Ikeda | ..................... | G01R 31/382 702/63 |
| 2014/0107949 A1* | 4/2014 | Arnold | ................ | G01R 31/392 702/42 |
| 2014/0132214 A1* | 5/2014 | Katanoda | ................ | B60L 58/15 320/109 |
| 2014/0176085 A1* | 6/2014 | Maruno | ................ | B60R 16/00 320/162 |
| 2014/0239900 A1* | 8/2014 | Abe | .................... | H01M 10/482 320/118 |
| 2014/0295261 A1* | 10/2014 | Miyake | ............. | H01M 10/0568 429/188 |
| 2016/0105044 A1* | 4/2016 | Yamaguchi | ........... | H02J 7/0013 320/112 |
| 2016/0111898 A1* | 4/2016 | Luo | ...................... | H02J 7/00711 320/162 |
| 2016/0146898 A1* | 5/2016 | Lennevi | .................. | B60L 58/13 324/426 |
| 2016/0202324 A1* | 7/2016 | Biletska | .................. | B60L 58/12 702/63 |
| 2016/0276843 A1 | 9/2016 | Chang et al. | | |
| 2016/0329716 A1* | 11/2016 | Inoue | ..................... | H02M 7/44 |
| 2016/0344208 A1 | 11/2016 | Kawamura et al. | | |
| 2017/0104359 A1* | 4/2017 | Jung | ....................... | H02J 7/0071 |
| 2017/0146610 A1* | 5/2017 | Cha | ........................ | H01M 10/48 |

(56) References Cited

U.S. PATENT DOCUMENTS

| | | | |
|---|---|---|---|
| 2017/0176544 A1* | 6/2017 | Shimizu | G01R 31/392 |
| 2017/0194799 A1* | 7/2017 | Tian | H02J 7/0071 |
| 2017/0244255 A1* | 8/2017 | Luo | H02J 7/007182 |
| 2017/0267116 A1* | 9/2017 | Lindemann | B60L 53/66 |
| 2017/0282739 A1* | 10/2017 | Cha | G07C 5/0825 |
| 2017/0282745 A1* | 10/2017 | Kawamura | B60L 58/13 |
| 2017/0285109 A1* | 10/2017 | Kawamura | G01R 31/392 |
| 2017/0299660 A1* | 10/2017 | Saint-Marcoux | B60L 58/13 |
| 2017/0338666 A1* | 11/2017 | Christensen | G01R 31/392 |
| 2017/0338668 A1* | 11/2017 | Sada | H02J 3/32 |
| 2017/0341520 A1 | 11/2017 | Chang et al. | |
| 2018/0050601 A1* | 2/2018 | Katanoda | B60L 58/13 |
| 2018/0134173 A1* | 5/2018 | Takebayashi | G01R 31/36 |
| 2018/0145526 A1* | 5/2018 | Ravi | H02J 7/0069 |
| 2018/0145527 A1* | 5/2018 | Ravi | G01R 31/3842 |
| 2018/0203071 A1* | 7/2018 | Takemura | H01M 10/48 |
| 2018/0261893 A1* | 9/2018 | Fujita | H02J 7/005 |
| 2018/0348304 A1* | 12/2018 | Tang | G01R 31/3648 |
| 2019/0036351 A1* | 1/2019 | Tian | H02J 7/0045 |
| 2020/0112178 A1* | 4/2020 | Jung | H02J 7/007182 |
| 2020/0136398 A1* | 4/2020 | Yamada | H02J 7/007 |
| 2020/0195029 A1* | 6/2020 | Fujita | H02J 7/0071 |
| 2020/0244075 A1* | 7/2020 | Park | H02J 7/0029 |
| 2020/0298726 A1* | 9/2020 | Satoh | B60L 58/10 |
| 2020/0341067 A1* | 10/2020 | Ruan | H01M 10/48 |
| 2020/0341073 A1* | 10/2020 | Tang | G01R 31/3842 |
| 2020/0371163 A1* | 11/2020 | Du | G01R 31/367 |
| 2020/0395775 A1* | 12/2020 | Hayayama | B60L 58/22 |
| 2020/0408842 A1 | 12/2020 | Sada et al. | |
| 2021/0011089 A1* | 1/2021 | Choi | H01M 10/48 |
| 2021/0041502 A1* | 2/2021 | Song | H02J 7/0013 |
| 2021/0048479 A1* | 2/2021 | Hyun | G01R 31/3646 |
| 2021/0066945 A1 | 3/2021 | Jung et al. | |
| 2021/0066947 A1* | 3/2021 | Du | H02J 7/007182 |
| 2021/0116513 A1* | 4/2021 | Du | H01M 10/48 |
| 2021/0132152 A1* | 5/2021 | Choi | H01M 10/425 |
| 2021/0141028 A1* | 5/2021 | Du | H02J 7/005 |
| 2021/0159711 A1* | 5/2021 | Yamada | A24F 40/05 |
| 2021/0249877 A1* | 8/2021 | Yamada | H02J 7/00041 |
| 2021/0249878 A1* | 8/2021 | Yamada | A24F 40/90 |
| 2021/0328449 A1 | 10/2021 | Li et al. | |
| 2021/0351446 A1* | 11/2021 | Zhu | H02J 7/0047 |
| 2021/0379999 A1* | 12/2021 | Yang | B60L 58/16 |
| 2022/0120821 A1* | 4/2022 | Ruan | G01R 31/3648 |
| 2022/0123578 A1* | 4/2022 | Du | H02J 7/007188 |
| 2022/0140636 A1* | 5/2022 | Yasugi | H01M 10/48 320/134 |
| 2022/0200313 A1* | 6/2022 | Ogasawara | H02J 7/00712 |
| 2022/0255336 A1* | 8/2022 | Li | H02J 7/0048 |
| 2022/0281350 A1* | 9/2022 | Tang | H01M 10/48 |
| 2022/0311262 A1 | 9/2022 | Schmidt et al. | |
| 2023/0001821 A1* | 1/2023 | Khaja | H02J 7/0048 |
| 2023/0021402 A1* | 1/2023 | Jung | G01R 31/3835 |
| 2023/0029223 A1* | 1/2023 | Du | G01R 31/3648 |
| 2023/0095453 A1* | 3/2023 | Du | G01R 31/382 324/432 |
| 2023/0133875 A1* | 5/2023 | Wang | H02J 7/0013 702/63 |
| 2023/0170711 A1* | 6/2023 | Wang | H02J 7/00304 320/118 |
| 2023/0204674 A1* | 6/2023 | Ruan | H02J 7/0048 324/427 |
| 2023/0307934 A1* | 9/2023 | Huang | B60L 53/66 |
| 2023/0336016 A1* | 10/2023 | Onishi | B60L 53/62 |
| 2023/0391221 A1* | 12/2023 | Matsuda | H02J 7/0071 |
| 2023/0402868 A1* | 12/2023 | Huang | H02J 7/0048 |
| 2024/0027536 A1* | 1/2024 | Han | H01M 10/482 |
| 2024/0061048 A1* | 2/2024 | Zou | H01M 10/486 |
| 2024/0178695 A1* | 5/2024 | Sun | H02J 7/005 |

FOREIGN PATENT DOCUMENTS

| | | |
|---|---|---|
| CN | 106166956 A | 11/2016 |
| CN | 109586373 A | 4/2019 |
| CN | 110828924 A | 2/2020 |
| CN | 110861535 A | 3/2020 |
| CN | 111066195 A | 4/2020 |
| CN | 111965558 A | 11/2020 |
| CN | 112366375 A | 2/2021 |
| CN | 112455286 A | 3/2021 |
| CN | 113013938 A | 6/2021 |
| DE | 102019123739 A1 | 3/2021 |
| JP | 2014209470 A | 11/2014 |
| JP | 2020064828 A | 4/2020 |
| KR | 20210069916 A | 6/2021 |
| KR | 20210090687 A | 7/2021 |
| WO | 2017143830 A1 | 8/2017 |
| WO | 2020216082 A1 | 10/2020 |

OTHER PUBLICATIONS

The written opinion received in the corresponding international application PCT/CN2021/117310, mailed May 27, 2022.
Notification of Registration received in the corresponding Chinese application 202180055585.5, mailed Nov. 3, 2023.
The extended European search report received in the corresponding European application 21956348.3, mailed on Mar. 13, 2024.
Decision to Grant a Patent received in the corresponding Japanese application 2023-534712, mailed on May 27, 2024.
Notice of Preliminary Rejection received in the counterpart Korean application 10-2023-7018327, mailed on Oct. 21, 2024.

* cited by examiner

METHOD FOR CHARGING TRACTION BATTERY AND BATTERY MANAGEMENT SYSTEM

CROSS-REFERENCE TO RELATED APPLICATIONS

The present application is a continuation of International Application No. PCT/CN2021/117310, filed on Sep. 8, 2021, the entire content of which is incorporated herein by reference.

TECHNICAL FIELD

The present application relates to the field of traction batteries, and in particular, to a method for charging a traction battery and a battery management system.

BACKGROUND ART

With the development of the times, electric vehicles have huge market prospects due to the high environmental protection, low noise, and low use costs of the electric vehicles, and can effectively promote energy conservation and emission reduction, which is beneficial to the development and progress of the society.

For electric vehicles, a traction battery technology is an important factor related to the development of the electric vehicles, which will affect people's acceptance of the electric vehicles. Therefore, how to improve the performance of a traction battery is a technical problem to be solved.

SUMMARY OF THE INVENTION

Embodiments of the present application provide a method for charging a traction battery and a battery management system, which can improve the performance of a traction battery.

According to a first aspect, a method for charging a traction battery is provided, which is applied to a battery management system BMS of the traction battery, and the method includes: obtaining a state of health SOH of the traction battery; in a charging process of the traction battery, obtaining a state of charge SOC of the traction battery; determining an SOC interval value corresponding to discharging or stopping being charged of the traction battery based on the SOH of the traction battery; and when the SOC of the traction battery changes by the SOC interval value, controlling the traction battery to discharge or stop being charged.

Through the technical solution of this embodiment of the present application, in the charging process of the traction battery, the traction battery can be controlled to discharge or temporarily stop being charged, to prevent the risk of lithium precipitation in the traction battery caused by continuous charging and improve the safety performance of the traction battery. Further, in the charging process of the traction battery, a discharging interval value or a charging stopping interval value may be determined based on the SOH of the traction battery, the interval value is the SOC interval value, and the SOH and the SOC of the traction battery are combined, to control discharging timing and timing of stopping being charged of the traction battery in the charging process, so that the overall charging design of the traction battery is more proper, and on the basis of ensuring the safety performance of the traction battery, the charging performance of the traction battery is also improved.

In some possible implementations, the determining an SOC interval value corresponding to discharging or stopping being charged of the traction battery based on the SOH of the traction battery includes: if the SOH of the traction battery is greater than or equal to a preset SOH threshold, determining that the SOC interval value is a first SOC interval value; and if the SOH of the traction battery is less than the preset SOH threshold, determining that the SOC interval value is a second SOC interval value, where the first SOC interval value is greater than the second SOC interval value.

In the technical solution of this implementation, one preset SOH threshold is set to divide the SOH of the traction battery into two ranges. If the SOH of the traction battery is greater than or equal to the preset SOH threshold, the state of health of the traction battery is relatively good. Then, it is determined that the SOC interval value corresponding to the discharging or the stopping being charged of the traction battery is the larger first SOC interval value. Otherwise, if the SOH of the traction battery is less than the preset SOH threshold, the state of health of the traction battery is relatively poor. Then, it is determined that the SOC interval value corresponding to the discharging or the stopping being charged of the traction battery is the smaller second SOC interval value. This technical solution makes it possible to more conveniently determine the SOC interval value corresponding to the discharging or the stopping being charged of the traction battery based on the SOH of the traction battery; when the state of health of the traction battery is relatively good, makes it possible to guarantee the safety performance of the traction battery and also increase a charge rate; and when the state of health of the traction battery is relatively poor, makes it possible to fully guarantee the safety performance of the traction battery, and prevent lithium precipitation from further affecting the remaining life of the traction battery.

In some possible implementations, the determining an SOC interval value corresponding to discharging or stopping being charged of the traction battery based on the SOH of the traction battery includes: determining the SOC interval value corresponding to the discharging or the stopping being charged of the traction battery based on the SOH and the SOC of the traction battery.

In the technical solution of this implementation, the SOC interval value corresponding to the discharging or the stopping being charged of the traction battery is not determined only based on the SOH of the traction battery. Instead, the SOC interval value corresponding to the discharging or the stopping being charged of the traction battery is determined comprehensively based on the SOH and SOC of the traction battery. The discharging control or charging stopping control of the traction battery in the charging process is considered based on both the state of health and the state of charge of the traction battery, which is conducive to further improving the safety performance and the charging performance of the traction battery.

In some possible implementations, the determining the SOC interval value corresponding to the discharging or the stopping being charged of the traction battery based on the SOH and the SOC of the traction battery includes: if the SOH of the traction battery is greater than or equal to the preset SOH threshold, and the SOC of the traction battery is less than a preset SOC threshold, determining that the SOC interval value is a third SOC interval value; if the SOH of the traction battery is greater than or equal to the preset SOH threshold, and the SOC of the traction battery is greater than or equal to the preset SOC threshold, determining that the SOC interval value is a fourth SOC interval value; if the SOH of the traction battery is less than the preset SOH threshold, and the SOC of the traction battery is less than the preset SOC threshold, determining that the SOC interval value is a fifth SOC interval value; and if the SOH of the traction battery is less than the preset SOH threshold, and the SOC of the traction battery is greater than or equal to the preset SOC threshold, determining that the SOC interval value is a sixth SOC interval value, where the third SOC interval value is greater than the fourth SOC interval value, and the fifth SOC interval value is greater than the sixth SOC interval value.

In the technical solution of this implementation, in addition to determining a relationship between the SOH of the traction battery and the preset SOH threshold, a relationship between the SOC of the traction battery and the preset SOC threshold is further determined. If the SOC of the traction battery is relatively large (that is, greater than or equal to the preset SOC threshold), it means that a current remaining capacity of the traction battery is relatively high, a potential of a negative electrode of the traction battery is relatively low, and the negative electrode is more prone to lithium precipitation. Therefore, when the SOC of the traction battery is relatively large, discharging frequency or charging stopping frequency of the traction battery needs to be increased, and the traction battery is controlled to discharge or stop being charged at an interval with a smaller SOC interval value, which prevents the occurrence of lithium precipitation, and ensures the safety performance of the traction battery. Correspondingly, if the SOC of the traction battery is relatively small (for example, less than the preset SOC threshold), it means that the current remaining capacity of the traction battery is relatively low, the potential of the negative electrode of the traction battery is relatively high, and the negative electrode is less prone to lithium precipitation compared with the case in which the potential of the negative electrode is relatively low. Therefore, when the SOC of the traction battery is relatively small, the discharging frequency or the charging stopping frequency of the traction battery may be reduced, and the traction battery may be controlled to discharge or stop being charged at an interval with a larger SOC interval value, which may also prevent the occurrence of lithium precipitation, and relatively increase the charge rate while ensuring the safety performance of the traction battery.

In some possible implementations, the preset SOH threshold ranges from 80% to 99%.

In the technical solution of this implementation, the preset SOH threshold is set, so that the state of health of the traction battery can be well determined, and the safety performance and the charging performance of the traction battery can be ensured and balanced.

In some possible implementations, the determining an SOC interval value corresponding to discharging or stopping being charged of the traction battery based on the SOH of the traction battery includes: determining the SOC interval value corresponding to the discharging or the stopping being charged of the traction battery based on the SOH of the traction battery and a preset mapping relationship.

In the technical solution of this implementation, the SOC interval value corresponding to the discharging or the stopping being charged of the traction battery may be determined directly based on the SOH of the traction battery and the preset mapping relationship, and an SOC interval value corresponding to each SOH of the traction battery may be conveniently and accurately determined, to further improve the safety performance and the charging performance of the traction battery.

In some possible implementations, the SOC interval value ranges from 3% to 95%.

In some possible implementations, before the controlling the traction battery to discharge, the method further includes: sending charging demand information, where a current demand value carried in the charging demand information is zero, and the charging demand information is used to control the traction battery to stop being charged.

If the traction battery is directly controlled to discharge in the charging process of the traction battery, it will not only cause damage to the traction battery and affect the life of the traction battery, but also bring a potential safety hazard and affect the safety of the traction battery. In the technical solution of this implementation, after the BMS sends the charging demand information, and the charging demand information is used to control the traction battery to stop being charged, the BMS then controls the traction battery to discharge, which can ensure the life and performance of the traction battery and improve the safety of a charging and discharging process of the traction battery.

In some possible implementations, before the controlling the traction battery to discharge, the method further includes: obtaining a current of the traction battery; and the controlling the traction battery to discharge includes: when the current of the traction battery is less than or equal to a preset current threshold, controlling the traction battery to discharge.

In the technical solution of this implementation, before controlling the traction battery to discharge, the BMS first obtains the current of the traction battery. When the current of the traction battery is small, for example, it is less than or equal to the preset current threshold. The BMS controls the traction battery to discharge only when impact on the discharging of the traction battery is small, which can further ensure the life and performance of the traction battery and improve the safety of the charging and discharging process of the traction battery.

In some possible implementations, the method further includes: when the discharging time of the traction battery is greater than or equal to a first preset time threshold or a time elapsed after the charging demand information is sent is greater than or equal to a second preset time threshold, control the traction battery to stop discharging.

In the charging process of the traction battery, a charging apparatus for charging the traction battery, such as a charger, can regularly or irregularly receive the charging demand information sent by the BMS. When the charging demand information is sent normally, the charging apparatus and the traction battery can maintain a normal communication state, and if the charging apparatus does not receive the charging demand information sent by the BMS within a period of time, it may cause the charging apparatus to disconnect a communication connection to the traction battery. Therefore, in the technical solution of this implementation, in addition to setting the first preset time threshold to control the discharging time of the traction battery, the second time threshold is also set to compare with the time elapsed after the charging demand information is sent, to prevent the time elapsed after the charging demand information is sent being too long and affecting the normal charging process of the traction battery, thereby improving the charging efficiency of the traction battery.

In some possible implementations, the method further includes: obtaining an operating status of the traction battery; and when the traction battery is in a state of unplugging a charging gun or a fully charged state, controlling the traction battery to discharge.

In the technical solution of this implementation, the BMS further obtains the operating status of the traction battery, and when the traction battery is in the state of unplugging a charging gun or the fully charged state, the BMS may control the traction battery to temporarily discharge, for example, discharge for a discharging time that is less than the preset time threshold and/or with a discharging current that is less than the preset current threshold, to prevent directly charging of the traction battery from causing the risk of lithium precipitation in the traction battery after the charging apparatus establishes a connection to the traction battery in a subsequent charging process of the traction battery, which will further improve the safety performance of the traction battery.

According to a second aspect, a battery management system BMS of a traction battery is provided, including: an obtaining module configured to obtain a state of health SOH of the traction battery, where the obtaining module is further configured to: in a charging process of the traction battery, obtain a state of charge SOC of the traction battery; and a control module configured to determine an SOC interval value corresponding to discharging or stopping being charged of the traction battery based on the SOH of the traction battery; and when the SOC of the traction battery changes by the SOC interval value, control the traction battery to discharge or stop being charged.

In some possible implementations, the control module is configured to: if the SOH of the traction battery is greater than or equal to a preset SOH threshold, determine that the SOC interval value is a first SOC interval value; and if the SOH of the traction battery is less than the preset SOH threshold, determine that the SOC interval value is a second SOC interval value, where the first SOC interval value is greater than the second SOC interval value.

In some possible implementations, the control module is configured to: determine the SOC interval value corresponding to the discharging or the stopping being charged of the traction battery based on the SOH and the SOC of the traction battery.

In some possible implementations, the control module is configured to: if the SOH of the traction battery is greater than or equal to the preset SOH threshold, and the SOC of the traction battery is less than a preset SOC threshold, determine that the SOC interval value is a third SOC interval value; if the SOH of the traction battery is greater than or equal to the preset SOH threshold, and the SOC of the traction battery is greater than or equal to the preset SOC threshold, determine that the SOC interval value is a fourth SOC interval value; if the SOH of the traction battery is less than the preset SOH threshold, and the SOC of the traction battery is less than the preset SOC threshold, determine that the SOC interval value is a fifth SOC interval value; and if the SOH of the traction battery is less than the preset SOH threshold, and the SOC of the traction battery is greater than or equal to the preset SOC threshold, determine that the SOC interval value is a sixth SOC interval value, where the third SOC interval value is greater than the fourth SOC interval value, and the fifth SOC interval value is greater than the sixth SOC interval value.

In some possible implementations, the preset SOH threshold ranges from 80% to 99%.

In some possible implementations, the control module is configured to: determine the SOC interval value corresponding to the discharging or the stopping being charged of the traction battery based on the SOH of the traction battery and a preset mapping relationship.

In some possible implementations, the SOC interval value ranges from 3% to 95%.

In some possible implementations, the BMS further includes a sending module configured to send charging demand information, where a current demand value carried in the charging demand information is zero, and the charging demand information is used to control the traction battery to stop being charged.

In some possible implementations, the obtaining module is further configured to: obtain a current of the traction battery; and the control module is configured to: when the current of the traction battery is less than or equal to a preset current threshold, control the traction battery to discharge.

In some possible implementations, the control module is configured to: when the discharging time of the traction battery is greater than or equal to a first preset time threshold or a time elapsed after the charging demand information is sent is greater than or equal to a second preset time threshold, control the traction battery to stop discharging.

According to a third aspect, a battery management system BMS of a traction battery is provided, including a processor and a memory, where the memory is configured to store a computer program, and the processor is configured to invoke the computer program to perform the method for charging the traction battery in the first aspect or any possible implementation of the first aspect.

Through the technical solution of the embodiments of the present application, in the charging process of the traction battery, the traction battery can be controlled to discharge or temporarily stop being charged, to prevent the risk of lithium precipitation in the traction battery caused by continuous charging and improve the safety performance of the traction battery. Further, in the charging process of the traction battery, a discharging interval value or a charging stopping interval value may be determined based on the SOH of the traction battery, the interval value is the SOC interval value, and the SOH and the SOC of the traction battery are combined, to control discharging timing and timing of stopping being charged of the traction battery in the charging process, so that the overall design of the traction battery is more proper, and on the basis of ensuring the safety performance of the traction battery, the charging performance of the traction battery is also improved.

BRIEF DESCRIPTION OF THE DRAWINGS

In order to illustrate the technical solutions of the embodiments of the present application more clearly, the drawings required in the description of the embodiments of the present application will be described briefly below. Obviously, the drawings described below are merely some embodiments of the present application, and for those of ordinary skill in the art, other drawings can also be obtained from these drawings without any creative efforts.

DETAILED DESCRIPTION OF EMBODIMENTS

Figure 1:
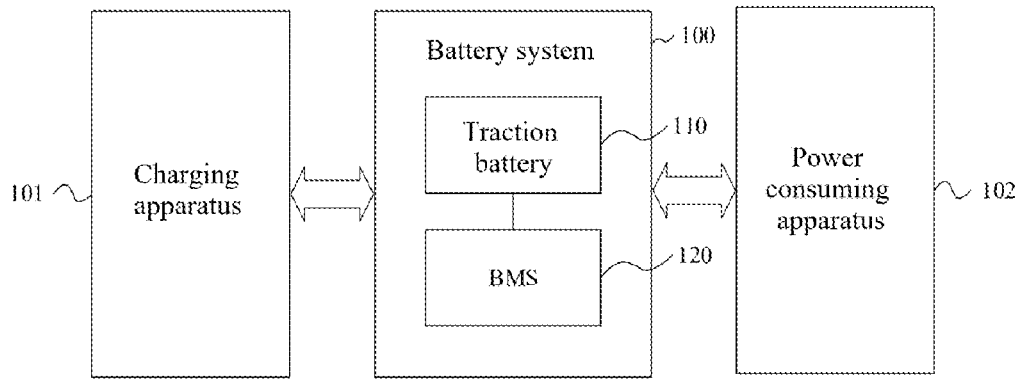
FIG. 1 is an architectural diagram of a battery system to which an embodiment of the present application is applicable.

The implementations of the present application will be further described in detail below in conjunction with the accompanying drawings and embodiments. The following detailed description of the embodiments and the accompanying drawings are used to illustrate the principle of the present application by way of example but should not be used to limit the scope of the present application. That is, the present application is not limited to the described embodiments.

In the description of the present application, it should be noted that "a plurality of" means two or more, unless otherwise specified. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and should not be construed as indicating or implying the relative importance.

The orientation terms in the following description all indicate directions shown in the drawings, but do not limit the specific structure in the present application. In the description of the present application, it should also be noted that the terms "disposing", "connecting", and "connection" should be interpreted in the broad sense unless explicitly defined and limited otherwise. For example, the terms may mean a fixed connection, a detachable connection, or an integral connection, or may mean a direct connection, or an indirect connection by means of an intermediate medium. For those of ordinary skill in the art, the specific meanings of the terms mentioned above in the present application can be construed according to specific circumstances.

In the new energy field, a traction battery is used as a main power source for a power consuming apparatus (such as a vehicle, a ship, or a spacecraft). The importance of the traction battery is self-evident. At present, most of the traction batteries on the market are rechargeable batteries, with most commonly lithium ion batteries or lithium ion polymer batteries. Charging of the traction battery at low temperature, or charging of the traction battery through a large charge rate or charging voltage, will cause lithium precipitation in the traction battery.

Lithium precipitation not only reduces the performance of the traction battery and greatly shortens a cycle life, but also limits a fast charging capacity of the traction battery, and may cause catastrophic consequences such as combustion and explosion, seriously affecting the overall performance of the traction battery.

In view of this, the present application proposes a method for charging a traction battery, which can solve a problem of lithium precipitation in the traction battery and improve the performance of the traction battery.

FIG. 1 shows a battery system 100 to which an embodiment of the present application is applicable.

As shown in FIG. 1, the battery system 100 may include: a traction battery 110 and a battery management system (BMS) 120.

Specifically, the traction battery 110 may include at least one battery module, which can provide energy and power for an electric vehicle. In terms of battery type, the traction battery 110 may be a lithium ion battery, a lithium metal battery, a lead-acid battery, a nickel-cadmium battery, a nickel-hydrogen battery, a lithium-sulfur battery, a lithium-air battery, a sodium-ion battery, or the like, which is not specifically limited in this embodiment of the present application. In terms of battery size, the battery module in the traction battery 110 in this embodiment of the present application may be a cell/battery cell, or may be a battery bank or battery pack, which is not specifically limited in this embodiment of the present application.

In addition, to intelligently manage and maintain the traction battery 110, prevent battery failure, and prolong a service life of the battery, the battery system 100 is generally equipped with a BMS 120, the BMS 120 is connected to the traction battery 110 and is used to monitor and acquire a parameter of the traction battery 110, and the BMS 120 may further control and manage the traction battery 110 based on the parameter.

As an example, the BMS 120 may be used to monitor and acquire parameters such as a voltage, a current, and a temperature of the traction battery 110. The BMS 120 may acquire a total voltage and a total current of the traction battery 110 in real time, a voltage and a current of a single battery cell in the traction battery 110, a temperature of at least one temperature measurement point in the traction battery 110, and the like. The real-time, fast, and accurate measurement of the above parameters is a basis for the normal operation of the BMS 120.

Optionally, the BMS 120 may further estimate a state of charge (SOC), a state of health (SOH), a state of power (SOP), and other parameters of the traction battery 110 based on the acquired parameters of the traction battery 110.

The SOC may be used to represent a remaining capacity of the traction battery 110, which is numerically defined as a ratio of a current remaining capacity to a total available capacity of the traction battery 110, usually expressed as a percentage. Specifically, when SOC=100%, it indicates that the traction battery 110 is fully charged; otherwise, when SOC=0%, it indicates that the traction battery 110 is fully discharged. Accurate estimation of the SOC is not only the most basic requirement for estimating an endurance mileage of an electric vehicle, but also a basic guarantee for improving the utilization efficiency and safety performance of the traction battery 110.

In addition, the SOH may be used to indicate a state of aging of the traction battery 110, or may be understood as a remaining life of the traction battery 110. It is well known that the performance of the traction battery 110 will continue to degrade after long-term operation. How to accurately estimate the SOH is an important prerequisite for estimating other parameters of the traction battery 110 (such as the SOC, the SOP, and other parameters). Generally, the SOH is usually expressed as a percentage. When SOH=100%, it indicates that the traction battery 110 is a new battery that has not been used. As a usage time increases, the SOH gradually decreases, and a remaining life of the traction battery becomes shorter. In the existing related art, various manners may be used to estimate the SOH of the traction battery 110, for example, the SOH may be estimated based on an available capacity of the traction battery 110. It can be understood that the available capacity of the traction battery 110 may decrease over time, and the SOH of the traction battery 110 may be estimated through a ratio of a current available capacity to an initial capacity (also referred to as a nominal capacity) of the traction battery 110.

The SOP may be used to indicate a state of power of the traction battery 110, usually represented by a short-term peak power. A peak power output from and input to the traction battery 110 directly affects the quick start, acceleration, and emergency braking capabilities of the vehicle, and further relates to the safety and reliability of the operation of the entire vehicle. Therefore, the BMS 120 needs to have a capability of estimating the peak power, that is, the SOP, of the traction battery 110.

It can be understood that the above only takes the SOC, SOH, and SOP as examples, and briefly describes some parameters that can be estimated by the BMS 120. In addition, the BMS 120 may be further used to determine other parameters of the traction battery 110, which is not specifically limited in the embodiments of the present application.

Further, after the BMS 120 obtains various parameters of the traction battery 110, various controls and managements of the traction battery 110 may be implemented based on the various parameters.

For example, the BMS 120 may control the charging and discharging of the traction battery 110 based on parameters such as the SOC, the voltage, and the current, to ensure normal energy supply and release of the traction battery 110.

For another example, the BMS 120 may further control components such as a cooling fan or a heating module based on parameters such as the temperature, to implement thermal management of the traction battery 110.

For another example, the BMS 120 may determine whether the traction battery 110 is in a normal operating state based on parameters such as the voltage and the SOH, to implement fault diagnosis and warning of the traction battery 110.

Optionally, as shown in FIG. 1, the battery system 100 may establish a connection to a charging apparatus 101 and a power consuming apparatus 102 to implement the charging and discharging of the traction battery 110.

Specifically, the BMS 120 in the battery system 100 may establish communication with the charging apparatus 101 through a related communication protocol, and then implement charging of the traction battery 110 through the charging apparatus 101.

Optionally, the BMS 120 may alternatively establish a communication connection to the power consuming apparatus 102, so that the BMS 120 may feed back obtained related information to the power consuming apparatus 102 and even the user, and the BMS 120 may also obtain related control information of the power consuming apparatus 102, to better control and manage the traction battery 110.

As an example, the charging apparatus 101 shown in FIG. 1 includes, but is not limited to, a charger (also referred to as a charging pile). In addition, the power consuming apparatus 102 may be various types of power consuming apparatuses, including but not limited to electric vehicles.

Figure 2:
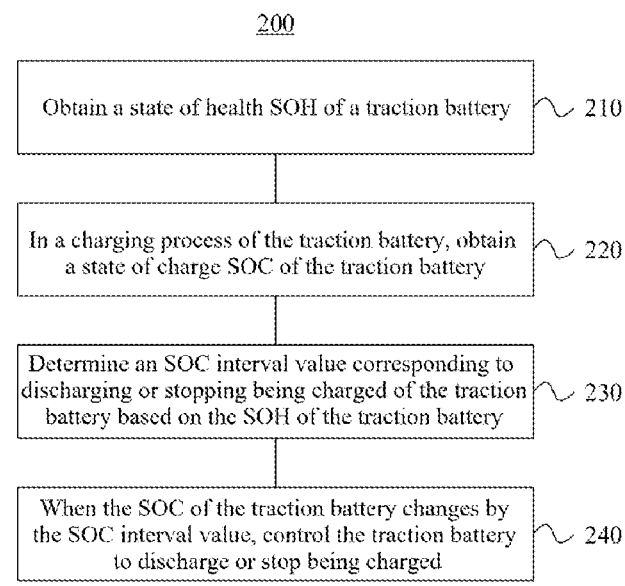
FIG. 2 is a schematic flow block diagram of a method for charging a traction battery according to an embodiment of the present application.

FIG. 2 is a schematic flow block diagram of a method 200 for charging a traction battery according to an embodiment of the present application. The method 200 for charging the traction battery may be applied to a battery management system of a traction battery. Optionally, in this embodiment of the present application, the traction battery may be the traction battery 110 shown in FIG. 1 above, and the method 200 may be applied to the BMS 120 of the traction battery 110. In other words, the BMS 120 may be used as an execution body of the method 200 in the following embodiment of the present application.

As shown in FIG. 2, in this embodiment of the present application, the method 200 for charging the traction battery may include the following steps:

210: obtaining a state of health SOH of the traction battery;

220: in a charging process of the traction battery, obtaining a state of charge SOC of the traction battery;

230: determining an SOC interval value corresponding to discharging or stopping being charged of the traction battery based on the SOH of the traction battery; and 240: when the SOC of the traction battery changes by the SOC interval value, controlling the traction battery to discharge or stop being charged.

Through the technical solution of this embodiment of the present application, in the charging process of the traction battery, the traction battery can be controlled to discharge or temporarily stop being charged, to prevent the risk of lithium precipitation in the traction battery caused by continuous charging and improve the safety performance of the traction battery. Further, in the charging process of the traction battery, a discharging interval value or a charging stopping interval value may be determined based on the SOH of the traction battery, the interval is the SOC interval value, and the SOH and the SOC of the traction battery are combined, to control discharging timing and timing of stopping being charged of the traction battery in the charging process, so that the overall charging design of the traction battery is more proper, and on the basis of ensuring the safety performance of the traction battery, the charging performance of the traction battery is also improved.

Specifically, as described in the embodiment shown in FIG. 1 above, the SOH may be used to indicate a state of aging of the traction battery, or may be understood as a remaining life of the traction battery. The performance of the traction battery will continue to degrade after long-term operation, and therefore, a remaining life will be shorter, that is, the SOH value usually expressed as a percentage will be smaller.

Optionally, in step 210 of this embodiment of the present application, the BMS may obtain the SOH of the traction battery before being charged. For the method for obtaining the SOH of the traction battery, reference may be made to a method in the related art, which will not be described in detail herein. In some implementations, after the BMS obtains the SOH of the traction battery, the BMS may store the SOH to a storage unit. When the traction battery is subsequently charged, a discharging interval value or a charging stopping interval value in the charging process of the traction battery may be determined based on the stored SOH.

For step 220 of this embodiment of the present application, in the charging process of the traction battery, the SOC of the traction battery may change in real time, and the BMS may regularly or irregularly obtain a varying SOC and another varying battery parameter of the traction battery in the charging process of the traction battery, to monitor a charging state of the traction battery.

Optionally, in some implementations, if a charger is used to charge the traction battery, the BMS may obtain the SOC of the traction battery according to requirements in related charging standards.

Further, for step 230 of this embodiment of the present application, in the charging process of the traction battery, the BMS determines the SOC interval value corresponding to the discharging or the stopping being charged of the traction battery based on the SOH of the traction battery that is obtained above, where the SOC interval value may also be expressed as a percentage.

In other words, in this embodiment of the present application, an SOC interval value used to control the traction battery to discharge or stop being charged is related to the SOH of the traction battery. If the SOH of the traction battery changes, the SOC interval value may change accordingly, that is, the discharging interval or the charging stopping interval of the traction battery also changes, so that the discharging interval or the charging stopping interval in the charging process of the traction battery is related to the SOH of the traction battery, and the charging performance of the traction battery is taken into account while improving the safety performance of the traction battery.

Further, for step 240 of this embodiment of the present application, in the charging process of the traction battery, the SOC of the traction battery changes in real time, and when the SOC changes by the SOC interval value, the BMS controls the traction battery to discharge or stop being charged. As an example, if the SOC interval value is X %, and when it is detected that the SOC of the traction battery changes by X %, the BMS controls the traction battery to discharge or stop being charged, where X is a positive number less than 100.

In some specific implementations, after the BMS obtains a current SOC of the traction battery, it is determined whether the SOC is a target SOC value. The target SOC value is a SOC value determined based on the SOC interval value. For example, if the SOC interval value is 5%, the target SOC value may be 5%, 10%, 15%, or the like. When determining that the current SOC of the traction battery is the target SOC value, the BMS controls the traction battery to discharge or stop being charged. Otherwise, when determining that the current SOC of the traction battery is not the target SOC value, the BMS continues to continuously detect the SOC of the traction battery.

For step 240, optionally, in some implementations, when the SOC of the traction battery changes by the SOC interval value, the BMS may control the traction battery to discharge based on a preset discharging parameter. As an example, the BMS may control the traction battery to discharge one or more times with the preset discharging parameter, that is, to apply negative pulses of one or more preset waveforms to the traction battery in the charging process.

Alternatively, in other implementations, when the SOC of the traction battery changes by the SOC interval value, the BMS may alternatively determine a required discharging parameter based on a state parameter of the traction battery, to control the traction battery to discharge. As an example, the state parameter of the traction battery may include at least one of the following parameters: a state of charge SOC, a state of health SOH, and a temperature; and the BMS may determine a discharging parameter based on at least one of the SOC, the SOH, and the temperature of the traction battery, to control the traction battery to discharge.

In the above implementations, the discharging parameter includes but is not limited to: a discharging current, a discharging time, a discharging waveform, and the like.

Optionally, the above discharging current may range from 1 A to 5 A. Specifically, the discharging current is greater than or equal to 1 A, and a discharge rate of the discharging current is less than or equal to 5 C. Optionally, the above discharging time may range from is to $60s$. Optionally, the discharging waveform includes but is not limited to any one or more of a square wave, a trapezoidal wave, a sine wave, or a triangular wave. This embodiment of the present application does not specifically limit a specific value of the discharging parameter of the traction battery.

In addition, in this embodiment of the present application, a discharging object of the traction battery may be a power consuming apparatus where the traction battery is located, or may be a charging apparatus for charging the traction battery, or may be another external apparatus other than the power consuming apparatus and the charging apparatus. This embodiment of the present application does not specifically limit the discharging object of the traction battery.

For step 240, in addition to the above technical solution of BMS controlling the traction battery to discharge, when the SOC of the traction battery changes by the SOC interval value, the BMS may further control the traction battery to stop being charged based on a preset time value. Optionally, the preset time value may be a stop time value determined based on the state parameter of the traction battery.

Optionally, each time the SOC of the traction battery changes by the SOC interval value, the BMS may control the traction battery to discharge or stop being charged. In other words, in the entire charging process, the BMS may continuously control the charging of the traction battery according to the change of the SOC of the traction battery.

Through the technical solution of this embodiment of the present application, the SOC interval value instead of another type of interval value is determined based on the SOH of the traction battery, which can better perform discharging control or charging stopping control based on a current state of the traction battery in the charging process, and further improve the safety performance and the charging performance of the battery.

It should be noted that in the embodiment shown in FIG. 2 above, although step 220 is shown before step 230, this embodiment of the present application does not specifically limit the sequence of performing step 220 and step 230. In other words, step 220 may be performed before step 230, or step 220 may be performed after step 230.

Figure 3:
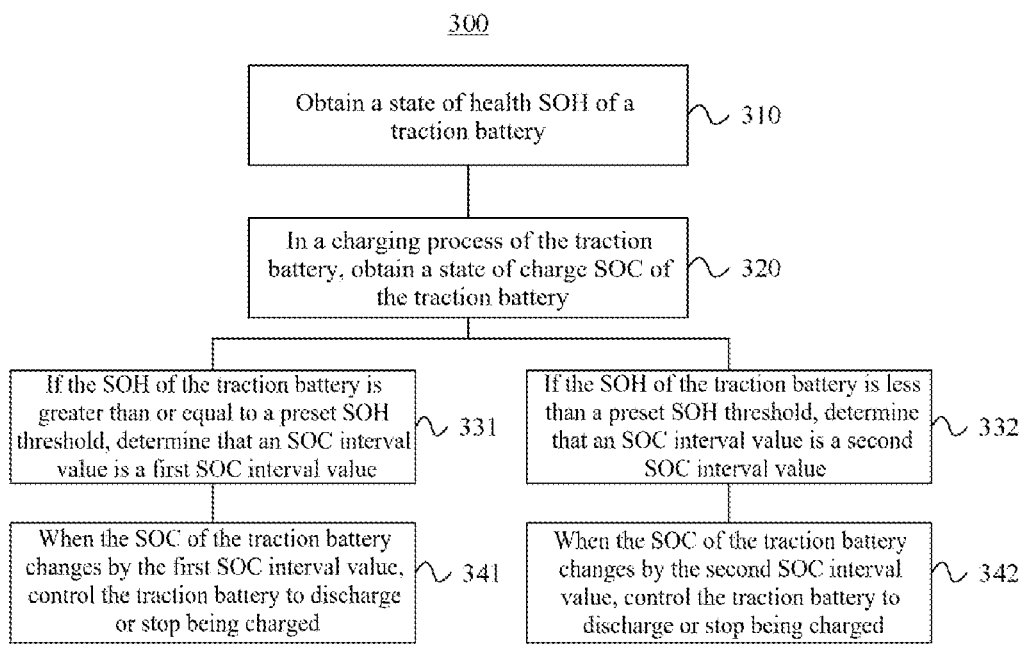
FIG. 3 is a schematic flow block diagram of another method for charging a traction battery according to an embodiment of the present application.

FIG. 3 is a schematic flow block diagram of another method 300 for charging a traction battery according to an embodiment of the present application.

As shown in FIG. 3, in this embodiment of the present application, the method 300 for charging the traction battery may include the following steps:

310: obtaining a state of health SOH of the traction battery;

320: in a charging process of the traction battery, obtaining a state of charge SOC of the traction battery;

331: if the SOH of the traction battery is greater than or equal to a preset SOH threshold, determining that an SOC interval value is a first SOC interval value; and

341: when the SOC of the traction battery changes by the first SOC interval value, controlling the traction battery to discharge or stop being charged; or 332: if the SOH of the traction battery is less than a preset SOH threshold, determining that an SOC interval value is a second SOC interval value; and 342: when the SOC of the traction battery changes by the second SOC interval value, controlling the traction battery to discharge or stop being charged.

Specifically, in this embodiment of the present application, for the related technical solutions of step 310 and step 320, reference may be made to the related description of step 210 and step 220 in FIG. 2 above, which will not be described in detail herein.

In addition, step 331 and step 332 in this embodiment of the present application may be a relatively specific implementation of step 230 in FIG. 2 above. Correspondingly, step 341 and step 342 in this embodiment of the present application may be a relatively specific implementation of step 240 in FIG. 2 above.

For step 331 and step 332, in this embodiment of the present application, the SOH of the traction battery may be compared with the preset SOH threshold, to determine the first SOC interval value and the second SOC interval value that are different, where the first SOC interval value is greater than the second SOC interval value.

Specifically, compared with a traction battery with poorer state of health, a smaller SOH, and a lower remaining life, under the same charging environment and charging conditions, a traction battery with a better state of health, a larger SOH, and a higher remaining life is less prone to lithium precipitation. Therefore, in this embodiment of the present application, if a state of health of the traction battery is relatively good and the SOH is relatively large (for example, greater than or equal to the preset SOH threshold), discharging frequency or charging stopping frequency of the traction battery may be reduced, and the traction battery may be controlled to discharge or stop being charged at an interval with a larger SOC interval value (for example, the first SOC interval value), which may also ensure that lithium precipitation does not occur in the traction battery, and the charge rate is relatively increased. Correspondingly, if a state of health of the traction battery is relatively poor and the SOH is relatively small (for example, less than the preset SOH threshold), discharging frequency or charging stopping frequency of the traction battery may be increased, and the traction battery may be controlled to discharge or stop being charged at an interval with a smaller SOC interval value (for example, the second SOC interval value), so that it can be ensured that lithium precipitation does not occur in the traction battery, and the safety performance of the traction battery is ensured.

In this embodiment of the present application, one preset SOH threshold is set to divide the SOH of the traction battery into two ranges. If the SOH of the traction battery is greater than or equal to the preset SOH threshold, a state of health of the traction battery is relatively good. Then, it is determined that the SOC interval value corresponding to the discharging or the stopping being charged of the traction battery is the larger first SOC interval value. Otherwise, if the SOH of the traction battery is less than the preset SOH threshold, the state of health of the traction battery is relatively poor. Then, it is determined that the SOC interval value corresponding to the discharging or the stopping being charged of the traction battery is the smaller second SOC interval value. This technical solution makes it possible to more conveniently determine the SOC interval value corresponding to the discharging or the stopping being charged of the traction battery based on the SOH of the traction battery; when the state of health of the traction battery is relatively good, makes it possible to guarantee the safety performance of the traction battery and also increase a charge rate; and when the state of health of the traction battery is relatively poor, makes it possible to fully guarantee the safety performance of the traction battery, and prevent lithium precipitation from further affecting the remaining life of the traction battery.

Optionally, in this embodiment of the present application, the preset SOH threshold may be used to evaluate whether the state of health of the traction battery is good. The preset SOH threshold may be set based on a type of the traction battery, an application scenario, actual needs, and the like. This embodiment of the present application does not specifically limit the preset SOH threshold.

In some possible implementations, the preset SOH threshold may range from 80% to 99%, so that the state of health of the traction battery can be well determined based on the preset SOH threshold, and the safety performance and the charging performance of the traction battery can be guaranteed and balanced.

In some scenarios that have strict requirements on the performance of the traction battery, for example, the traction battery operates in a low-temperature or ultra-low temperature environment, the preset SOH threshold may be set higher, for example, it may be 99%; and only when the SOH of the traction battery is greater than or equal to 99%, the traction battery may be controlled to discharge or stop being charged at an interval with the larger first SOC interval value. Certainly, in the case of other different application scenarios and different battery types, the preset SOH threshold may take other specific values from 80% to 99%.

In addition to the preset SOH threshold, optionally, the SOC interval value (including the first SOC interval value and the second SOC interval value in the above embodiment) in this embodiment of the present application may be alternatively preset values that are set based on a type of the traction battery, an application scenario, actual needs, and the like. This embodiment of the present application does not specifically limit the SOC interval value.

In some possible implementations, the SOC interval value may range from 3% to 95%. In some scenarios that have strict requirements on the performance of the traction battery, for example, the traction battery operates in a low-temperature or ultra-low temperature environment, the first SOC interval value and the second SOC interval value may be set relatively high to prevent the occurrence of lithium precipitation in the traction battery in the low temperature or ultra-low temperature environment. Certainly, in the case of other different application scenarios and different battery types, the first SOC interval value and the second SOC interval value may take other specific values from 3% to 95%.

In the embodiment of the present application shown in FIG. 3 above, only one preset SOH threshold is set to divide the SOH of the traction battery into two ranges, so that two different SOC interval values are set correspondingly, and similarly, two or more preset SOH thresholds may be further set to divide the SOH of the traction battery into three or more ranges, so that more different SOC interval values are set correspondingly, so as to adaptively improve the accuracy of discharging control or charging stopping control in the charging process in different SOH ranges, and further accurately taking into account the safety performance and the charge rate of the traction battery.

As an example, two preset SOH thresholds may be set, which are 1 #preset SOH threshold A % and 2 #preset SOH threshold B %, where A %<B %. When the SOH of the traction battery is within a range [0, A %), the SOC interval value is 1 #SOC interval value u %, when the SOH of the traction battery is within a range [A %, B %), the SOC interval value is 2 #SOC interval value v %, and when the SOH of the traction battery is within a range [B %, 100%], the SOC interval value is 3 #SOC interval value w %, where u %<v %<w %, and A, B, u, v, and w are all positive numbers.

Optionally, for the ranges of the above two or more preset SOH thresholds (including 1 #preset SOH threshold and 2 #preset SOH threshold), and the ranges of more different SOC interval values (including 1 #SOC interval value, 2 #SOC interval value, and 3 #SOC interval value), reference may be made to the range of the preset SOH threshold value and the range of the SOC interval value in the embodiment shown in FIG. 3 above.

Figure 4:
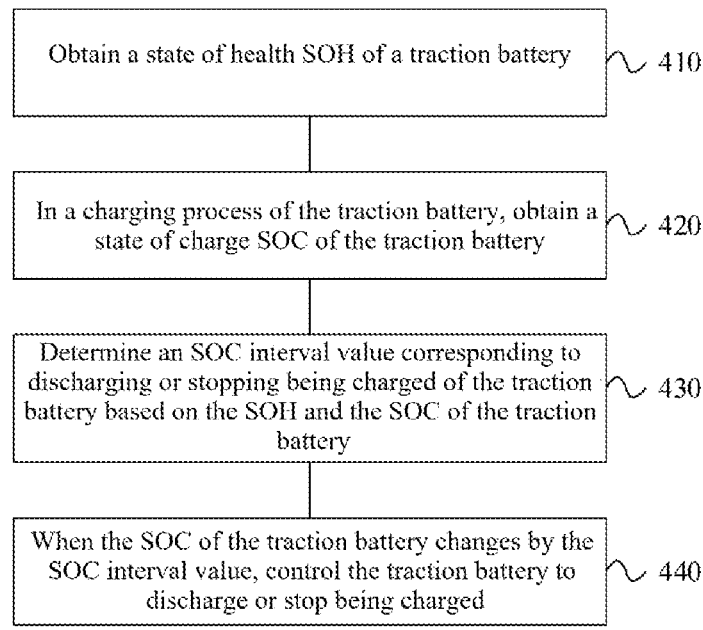
FIG. 4 is a schematic flow block diagram of another method for charging a traction battery according to an embodiment of the present application.

FIG. 4 is a schematic flow block diagram of another method 400 for charging a traction battery according to an embodiment of the present application.

As shown in FIG. 4, in this embodiment of the present application, the method 400 for charging the traction battery may include the following steps:

410: obtaining a state of health SOH of the traction battery;

420: in a charging process of the traction battery, obtaining a state of charge SOC of the traction battery;

430: determining an SOC interval value corresponding to discharging or stopping being charged of the traction battery based on the SOH and the SOC of the traction battery; and 440: when the SOC of the traction battery changes by the SOC interval value, controlling the traction battery to discharge or stop being charged.

Specifically, in this embodiment of the present application, for the related technical solutions of step 410, step 420, and step 440, reference may be made to the related description of step 210, step 220, and step 240 in FIG. 2 above, which will not be described in detail herein.

In addition, step 430 in this embodiment of the present application may be another relatively specific implementation of step 230 shown in FIG. 2.

Through the technical solution of this embodiment of the present application, the SOC interval value corresponding to the discharging or the stopping being charged of the traction battery is not determined only based on the SOH of the traction battery. Instead, the SOC interval value corresponding to the discharging or the stopping being charged of the traction battery is determined comprehensively based on the SOH and SOC of the traction battery. The discharging control or charging stopping control of the traction battery in the charging process is considered based on both the state of health and the state of charge of the traction battery, which is conducive to further improving the safety performance and the charging performance of the traction battery.

Optionally, in some implementations, based on the technical solution shown in FIG. 3 above, on the basis of setting one or more preset SOH thresholds to obtain a plurality of SOH ranges through division, one or more preset SOC thresholds are further set to obtain a plurality of SOC ranges through division, and the SOC interval value corresponding to the discharging or the stopping being charged of the traction battery is determined based on ranges where the SOH and the SOC of the traction battery are located.

As an example, if one preset SOH threshold is set and one preset SOC threshold is set, step 430 above may specifically include the following steps:

if the SOH of the traction battery is greater than or equal to the preset SOH threshold, and the SOC of the traction battery is less than the preset SOC threshold, determining that the SOC interval value is a third SOC interval value;

if the SOH of the traction battery is greater than or equal to the preset SOH threshold, and the SOC of the traction battery is greater than or equal to the preset SOC threshold, determining that the SOC interval value is a fourth SOC interval value;

if the SOH of the traction battery is less than the preset SOH threshold, and the SOC of the traction battery is less than the preset SOC threshold, determining that the SOC interval value is a fifth SOC interval value; and if the SOH of the traction battery is less than the preset SOH threshold, and the SOC of the traction battery is greater than or equal to the preset SOC threshold, determining that the SOC interval value is a sixth SOC interval value, where the third SOC interval value is greater than the fourth SOC interval value, and the fifth SOC interval value is greater than the sixth SOC interval value.

Specifically, in this embodiment of the present application, in addition to determining a relationship between the SOH of the traction battery and the preset SOH threshold, a relationship between the SOC of the traction battery and the preset SOC threshold is further determined. If the SOC of the traction battery is relatively large (that is, greater than or equal to the preset SOC threshold), it means that a current remaining capacity of the traction battery is relatively high, a potential of a negative electrode of the traction battery is relatively low, and the negative electrode is more prone to lithium precipitation. Therefore, when the SOC of the traction battery is relatively large, discharging frequency or charging stopping frequency of the traction battery needs to be increased, and the traction battery is controlled to discharge or stop being charged at an interval with a smaller SOC interval value, which prevents the occurrence of lithium precipitation, and ensures the safety performance of the traction battery. Correspondingly, if the SOC of the traction battery is relatively small (for example, less than the preset SOC threshold), it means that the current remaining capacity of the traction battery is relatively low, the potential of the negative electrode of the traction battery is relatively high, and the negative electrode is less prone to lithium precipitation compared with the case in which the potential of the negative electrode is relatively low. Therefore, when the SOC of the traction battery is relatively small, the discharging frequency or the charging stopping frequency of the traction battery may be reduced, and the traction battery may be controlled to discharge or stop being charged at an interval with a larger SOC interval value, which may also prevent the occurrence of lithium precipitation, and relatively increase the charge rate while ensuring the safety performance of the traction battery.

Therefore, when the SOH of the traction battery is greater than or equal to the preset SOH threshold, if the SOC of the traction battery is less than the preset SOC threshold, it is determined that the SOC interval value is the third SOC interval value, and if the SOC of the traction battery is greater than or equal to the preset SOC threshold, it is determined that the SOC interval value is the fourth SOC interval value, where the third SOC interval value is greater than the fourth SOC interval value. Similarly, when the SOH of the traction battery is less than the preset SOH threshold, if the SOC of the traction battery is less than the preset SOC threshold, it is determined that the SOC interval value is the fifth SOC interval value, and if the SOC of the traction battery is greater than or equal to the preset SOC threshold, it is determined that the SOC interval value is the sixth SOC interval value, where the fifth SOC interval value is greater than the sixth SOC interval value.

In this embodiment of the present application, a relationship between the fourth SOC interval value and the fifth SOC interval value is not specifically limited, and may be designed according to actual situations.

It should be noted that, in this embodiment of the present application, for the range of the preset SOH threshold, reference may be made to the related description of the preset SOH threshold in FIG. 3 in which the preset SOH threshold may range from 80% to 99%. In addition, the range of the above preset SOC threshold is not specifically limited in this embodiment of the present application, and as an example, the preset SOC threshold includes but is not limited to 50%. Furthermore, for the range of the above SOC interval value (including the third SOC interval value, the fourth SOC interval value, the fifth SOC interval value, and the sixth SOC interval value), similarly, reference may be made to the range of the preset SOC threshold value in the embodiment shown in FIG. 3 above. The SOC interval value ranges from 3% to 95%.

Figure 5:
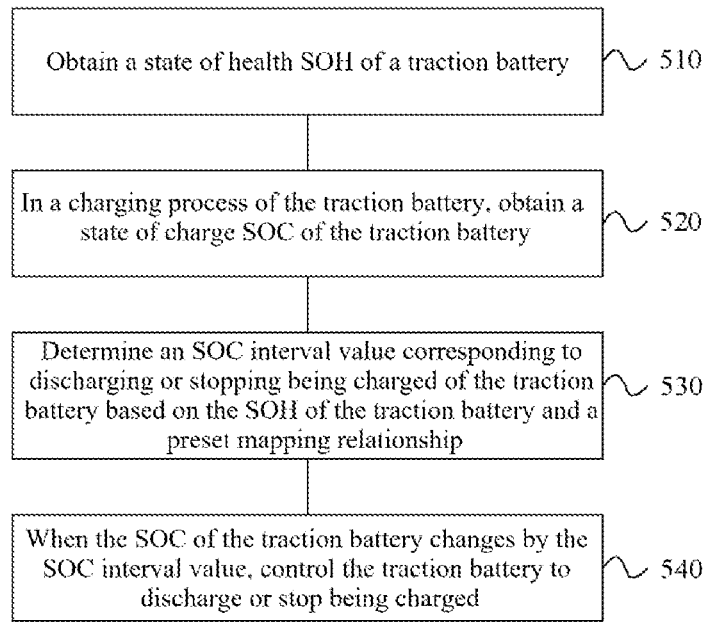
FIG. 5 is a schematic flow block diagram of another method for charging a traction battery according to an embodiment of the present application.

FIG. 5 is a schematic flow block diagram of another method 500 for charging a traction battery according to an embodiment of the present application.

As shown in FIG. 5, in this embodiment of the present application, the method 500 for charging the traction battery may include the following steps:

510: obtaining a state of health SOH of the traction battery;

520: in a charging process of the traction battery, obtaining a state of charge SOC of the traction battery;

530: determining an SOC interval value corresponding to discharging or stopping being charged of the traction battery based on the SOH of the traction battery and a preset mapping relationship; and 540: when the SOC of the traction battery changes by the SOC interval value, controlling the traction battery to discharge or stop being charged.

Specifically, in this embodiment of the present application, for the related technical solutions of step 510, step 520, and step 540, reference may be made to the related description of step 210, step 220, and step 240 in FIG. 2 above, which will not be described in detail herein.

In addition, step 530 in this embodiment of the present application may be another relatively specific implementation of step 230 shown in FIG. 2.

Through the technical solution of this embodiment of the present application, the SOC interval value corresponding to the discharging or the stopping being charged of the traction battery may be determined directly based on the SOH of the traction battery and the preset mapping relationship, and an SOC interval value corresponding to each SOH of the traction battery may be conveniently and accurately determined, to further improve the safety performance and the charging performance of the traction battery.

As an example, the preset mapping relationship may be a mapping table, and a mapping relationship between a plurality of SOHs and corresponding SOC interval values may be established according to actual needs. For example, Table 1 below shows a schematic mapping table.

TABLE 1

| | SOH value | | | | | |
|---|---|---|---|---|---|---|
| | 100% | 95% | 90% | 85% | 80% | 75% |
| SOC interval value | $C_1$ % | $C_2$ % | $C_3$ % | $C_4$ % | $C_5$ % | $C_6$ % |

Herein, $C_1$ to $C_6$ is a positive number less than 100, and $C_1 > C_2 > C_3 > C_4 > C_5 > C_6$. The mapping table may be stored in a storage unit of a BMS. If a current SOH of the traction battery is an SOH value existing in the table, the BMS may directly determine an SOC interval value corresponding to the current SOH of the traction battery. If the current SOH of the traction battery is not an SOH value existing in the table, the BMS may alternatively calculate an SOC interval value corresponding to the current SOH of the traction battery according to the mapping table.

As an example, if the current SOH of the traction battery is 98%, an SOC interval value $C_x$ % corresponding to the SOH may meet the following expression:

$$\frac{(C_1\% - C_2\%)}{(100\% - 95\%)} = \frac{(C_x\% - C_2\%)}{(98\% - 95\%)};$$

or $C_x$ % may alternatively meet the following expression:

$$\frac{(C_1\% - C_2\%)}{(100\% - 95\%)} = \frac{(C_1\% - C_x\%)}{(100\% - 98\%)}.$$

If the current SOH of the traction battery is another value, an SOC interval value corresponding to the SOH may also be determined with reference to the above calculation manner, and details will not be repeated herein.

Through the above mapping table, an SOC interval value corresponding to any SOH may be determined within a certain SOH range, the change of the SOC interval value under different SOHs can be controlled more accurately, and the safety performance and the charging performance of the traction battery may be balanced.

It should be noted that Table 1 above is only an illustration rather than a limitation of the mapping table. The specific SOH value and the specific SOC interval value in the mapping table are not limited in this embodiment of the present application, and may be set according to charge rate requirements, safety requirements, battery performance, and the like.

In addition to the above mapping table, the preset mapping relationship in the embodiment of the present application may be further a mapping formula. Specifically, a mapping formula between an SOC interval value and an SOH value may be established, and the mapping formula includes but is not limited to an increasing function formula.

As an example, the SOC interval value is represented by C %, and the SOH value is represented by H %, and the mapping formula between the SOC interval value and the SOH value may be the following formula:

$C\% = k_1 \times H\% + b_1$; or $C\% = k_2 \times (H\%)^2 + b_2$.

Herein, $k_1$, $k_2$, $b_1$, and $b_2$ are constants, and may be set according to charge rate requirements, safety requirements, battery performance, and the like, which is not specifically limited in this embodiment of the present application.

It should be noted that the above formulas are only for illustration and not limitation. In addition to the above two formulas, the mapping formula in the embodiment of the present application may be in another form, which is not specifically limited in the embodiment of the present application.

It should also be noted that, in addition to the above mapping table or the above mapping formula, the preset mapping relationship may be further another mapping form, for example, a mapping map or a neural network model, and the embodiment of the present application does not specifically limit a specific form of the preset mapping relationship. Specifically, the preset mapping relationship may be a mapping relationship obtained by fitting a large amount of experimental data, which has high reliability and accuracy, so as to ensure the safety performance and the charging performance of the traction battery.

It should also be noted that in this embodiment of the present application, in addition to determining the SOC interval value corresponding to the discharging or the stopping being charged of the traction battery based on the SOH of the traction battery and the preset mapping relationship, the SOC interval value corresponding to the discharging or the stopping being charged of the traction battery may be further determined based on another parameter of the traction battery such as the SOH and/or SOC of the traction battery and the preset mapping relationship.

Figure 6:
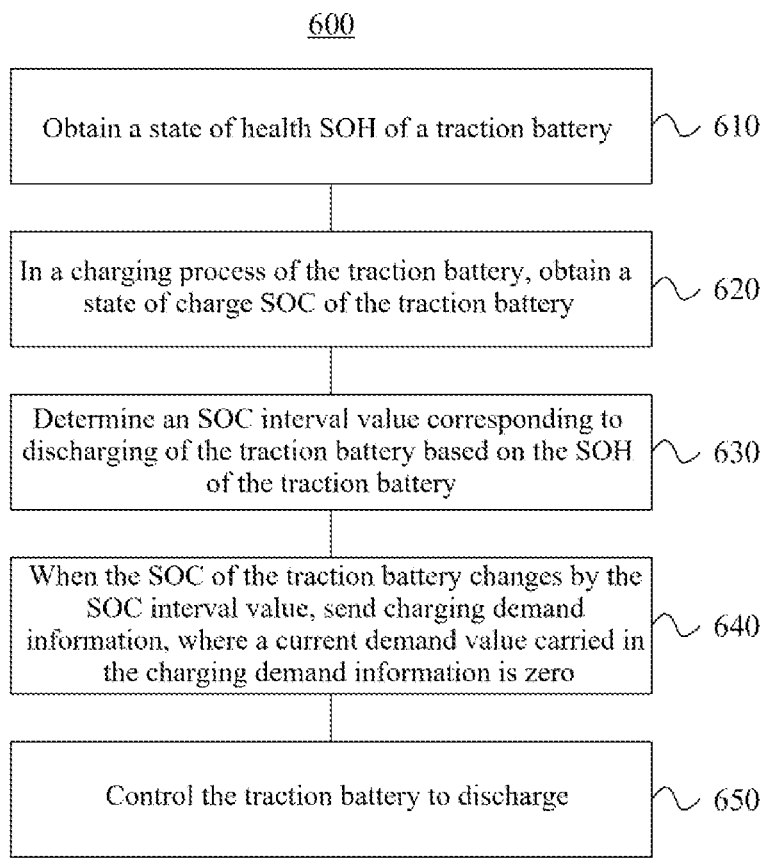
FIG. 6 is a schematic flow block diagram of another method for charging a traction battery according to an embodiment of the present application.

FIG. 6 is a schematic flow block diagram of another method 600 for charging a traction battery according to an embodiment of the present application. In this embodiment of the present application, a BMS determines an SOC interval value corresponding to discharging of the traction battery, and when an SOC of the traction battery changes by the SOC interval value, the traction battery is controlled to discharge.

As shown in FIG. 6, in this embodiment of the present application, the method 600 for charging the traction battery may include the following steps:

610: obtaining a state of health SOH of the traction battery;

620: in a charging process of the traction battery, obtaining the state of charge SOC of the traction battery;

630: determining the SOC interval value corresponding to the discharging of the traction battery based on the SOH of the traction battery;

640: when the SOC of the traction battery changes by the SOC interval value, sending charging demand information, where a current demand value carried in the charging demand information is zero; and 650: controlling the traction battery to discharge.

Specifically, in this embodiment of the present application, for the related technical solutions of step 610, step 620, and step 630, reference may be made to the related description of the above embodiments, which will not be described in detail herein.

In addition, when the SOC of the traction battery changes by the SOC interval value, the BMS first sends the charging demand information, the current demand value carried in the charging demand information is zero, and therefore, the charging demand information may be used to control the traction battery to stop being charged.

In some possible implementations, a charging apparatus, such as a charger, is used to charge the traction battery. In the charging process, when the SOC of the traction battery changes by the SOC interval value, the BMS first sends, to the charger, charging demand information with a current demand value being zero, the charger stops charging the traction battery based on the charging demand information.

Optionally, the charging demand information may be a communication packet. The communication packet includes but is not limited to a communication packet between the BMS and the charger that satisfies a related communication protocol. As an example, the charging demand information may be a battery charging demand BCL packet.

If the traction battery is directly controlled to discharge in the charging process of the traction battery, it will not only cause damage to the traction battery and affect the life of the traction battery, but also bring a potential safety hazard and affect the safety of the traction battery. Through the technical solution of this embodiment of the present application, after the BMS sends the charging demand information, and the charging demand information is used to control the traction battery to stop being charged, the BMS then controls the traction battery to discharge, which can ensure the life and performance of the traction battery and improve the safety of a charging and discharging process of the traction battery.

After the BMS sends the above charging demand information, the current of the traction battery changes slowly, and it takes a certain period of time to gradually drop to zero. Therefore, to further improve the safety of the charging and discharging process of the traction battery, before step 650 above, the method 600 in this embodiment of the present application may further include: obtaining the current of the traction battery. On this basis, step 650 may include: when the current of the traction battery is less than or equal to a preset current threshold, controlling the traction battery to discharge.

Through the technical solution of this embodiment of the present application, before controlling the traction battery to discharge, the BMS first obtains the current of the traction battery. When the current of the traction battery is small, for example, it is less than or equal to the preset current threshold. The BMS controls the traction battery to discharge only when impact on the discharging of the traction battery is small, which can further ensure the life and performance of the traction battery and improve the safety of the charging and discharging process of the traction battery.

Optionally, the preset current threshold may be set according to actual needs, which is not specifically limited in this embodiment of the present application. As an example, the preset current threshold may be less than or equal to 50 A.

In addition, it should be noted that if the BMS determines an SOC interval value corresponding to the stopping being charged of the traction battery, and an SOC of the traction battery changes by the SOC interval value, the traction battery is controlled to stop being charged. In the technical solution, the BMS may perform step 640 above, that is, when the SOC of the traction battery changes by the SOC interval value, the BMS sends the charging demand information, where the current demand value carried in the charging demand information is zero, to control the traction battery to stop being charged. Optionally, the BMS may regularly or irregularly send the charging demand information with a current demand value being zero, to control a time during which the traction battery stops being charged.

Figure 7:
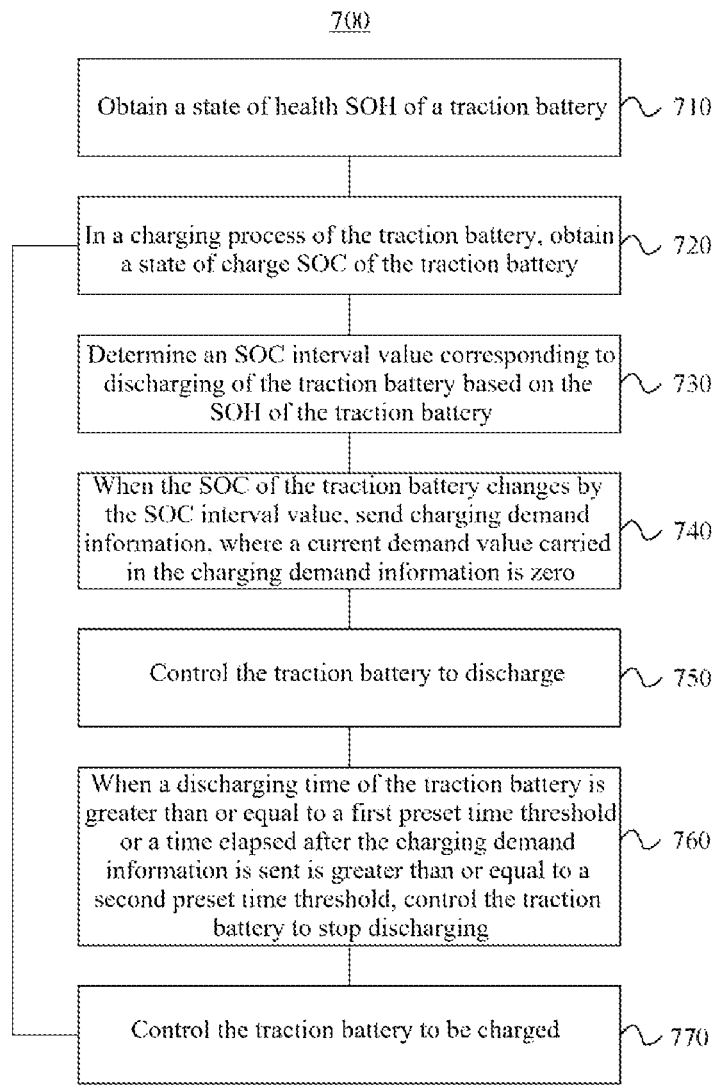
FIG. 7 is a schematic flow block diagram of another method for charging a traction battery according to an embodiment of the present application.

On the basis of the embodiment shown in FIG. 6, FIG. 7 is a schematic flow block diagram of another method 700 for charging a traction battery according to an embodiment of the present application.

As shown in FIG. 7, in this embodiment of the present application, the method 700 for charging the traction battery may include the following steps:

710: obtaining a state of health SOH of the traction battery;

720: in a charging process of the traction battery, obtaining a state of charge SOC of the traction battery;

730: determining an SOC interval value corresponding to discharging of the traction battery based on the SOH of the traction battery;

740: when the SOC of the traction battery changes by the SOC interval value, sending charging demand information, where a current demand value carried in the charging demand information is zero;

750: controlling the traction battery to discharge; and

760: when a discharging time of the traction battery is greater than or equal to a first preset time threshold or a time elapsed after the charging demand information is sent is greater than or equal to a second preset time threshold, controlling the traction battery to stop discharging.

Specifically, in this embodiment of the present application, for the related technical solutions of step 710 to step 750, reference may be made to the related description of the above embodiments, which will not be described in detail herein.

In addition, after the BMS controls the traction battery to discharge, it is determined whether to stop discharging based on the discharging time of the traction battery and the time elapsed after the charging demand information is sent. Specifically, when the discharging time of the traction battery is greater than or equal to the first preset time threshold, the traction battery is controlled to stop discharging; or when the time elapsed after the charging demand information is sent is greater than or equal to the second preset time threshold, the traction battery is controlled to stop discharging. Optionally, when controlling the traction battery to discharge, the BMS counts the discharging time of the traction battery, and determines whether the discharging time of the traction battery is greater than or equal to the first preset time threshold. In addition, after the charging demand information carrying a current demand value being zero is sent, the BMS may further count the time elapsed after the charging demand information is sent, and determine whether the time elapsed after the charging demand information is sent is greater than or equal to the second preset time threshold.

The first preset time threshold may be designed according to actual discharging requirements. When the traction battery is in different states, the first preset time threshold may be adjusted and changed based on a state parameter of the traction battery. As an example, when the traction battery is in different SOH and/or SOC states, the first preset time threshold may be adjusted and changed based on the SOH and/or the SOC of the traction battery. Alternatively, in other examples, the first preset time threshold may be alternatively a fixed threshold, which is not specifically limited in this embodiment of the present application. Optionally, the first preset time threshold in this embodiment of the present application may be the discharging time in the discharging parameters of the embodiment described above in FIG. 2.

In the charging process of the traction battery, a charging apparatus for charging the traction battery, such as a charger, can regularly or irregularly receive the charging demand information sent by the BMS. When the charging demand information is sent normally, the charging apparatus and the traction battery can maintain a normal communication state, and if the charging apparatus does not receive the charging demand information sent by the BMS within a period of time, it may cause the charging apparatus to disconnect a communication connection to the traction battery. Therefore, in this embodiment of the present application, in addition to setting the first preset time threshold to control the discharging time of the traction battery, the second time threshold is also set to compare with the time elapsed after the charging demand information is sent, to prevent the time elapsed after the charging demand information is sent being too long and affecting the normal charging process of the traction battery, thereby improving the charging efficiency of the traction battery.

Optionally, as shown in FIG. 7, the method 700 in this embodiment of the present application further includes step 770: controlling the traction battery to be charged. That is, after controlling the traction battery to stop discharging, the BMS controls the traction battery to be charged again.

In some implementations, the BMS may send a new charging demand message to the charging apparatus, such as a charger, and a current demand value carried in the charging demand message is not zero, but may be a current demand value determined according to a parameter of the traction battery, so that the charging apparatus may charge the traction battery based on the current demand value.

After step 770, step 720 to step 760 above may be performed again to implement a process of the BMS controlling the continuous charging and discharging of the traction battery.

In addition, it should be noted that if the BMS determines an SOC interval value corresponding to the stopping being charged of the traction battery, and an SOC of the traction battery changes by the SOC interval value, the traction battery is controlled to stop being charged. In the technical solution, if the time during which the traction battery stops being charged is greater than or equal to a third preset time threshold, the traction battery may be controlled to continue being charged, to implement a process of the BMS controlling the continuous charging of the traction battery. Optionally, the third preset time threshold in this embodiment of the present application may be the stop time value in the embodiment described above in FIG. 2.

Figure 8:
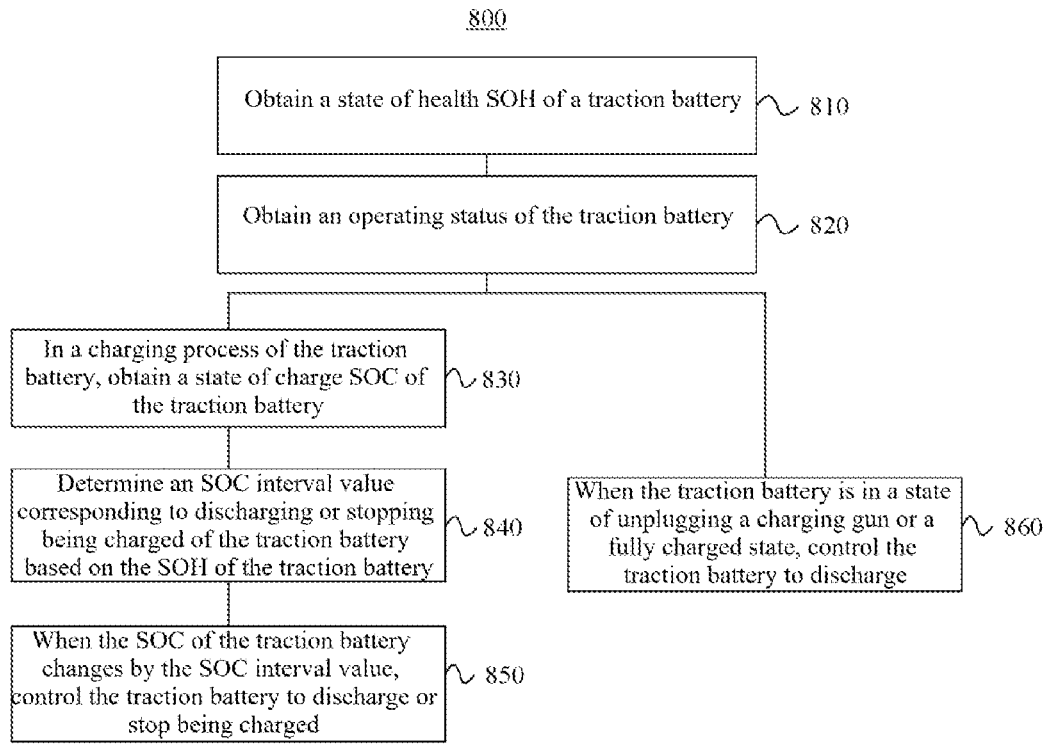
FIG. 8 is a schematic flow block diagram of another method for charging a traction battery according to an embodiment of the present application.

FIG. 8 is a schematic flow block diagram of another method 800 for charging a traction battery according to an embodiment of the present application.

As shown in FIG. 8, in this embodiment of the present application, the method 800 for charging the traction battery may include the following steps:

810: obtaining a state of health SOH of the traction battery;

820: obtaining an operating status of the traction battery;

830: in a charging process of the traction battery, obtaining a state of charge SOC of the traction battery;

840: determining an SOC interval value corresponding to discharging or stopping being charged of the traction battery based on the SOH of the traction battery; and 850: when the SOC of the traction battery changes by the SOC interval value, controlling the traction battery to discharge or stop being charged; or 860: when the traction battery is in a state of unplugging a charging gun or a fully charged state, controlling the traction battery to discharge.

Specifically, in this embodiment of the present application, for the related technical solutions of step 810, and step 830 to step 850, reference may be made to the related description of the above embodiments, which will not be described in detail herein.

In addition, before step 830, the BMS may first obtain the operating status of the traction battery, and when the traction battery is in a charging state, perform step 830, that is, obtain the SOC of the traction battery in the charging process of the traction battery, and perform step 840 to step 850.

For step 860, when the traction battery is in the state of unplugging a charging gun or the fully charged state, the traction battery is controlled to discharge. Specifically, the BMS may determine a current operating status of the traction battery by obtaining an operating parameter of the traction battery. When the traction battery is disconnected from the charging gun of the charger, the BMS determines that the traction battery may be in the state of unplugging a charging gun, that is, the charger is not charging the traction battery. In addition, the BMS may obtain a parameter such as a voltage of the traction battery to determine that when the SOC of the traction battery reaches 100%, the SOC of the traction battery reaches the fully charged state.

When the traction battery is in the state of unplugging a charging gun or the fully charged state, the BMS may control the traction battery to temporarily discharge, for example, discharge for a discharging time that is less than the preset time threshold and/or with a discharging current that is less than the preset current threshold, to prevent directly charging of the traction battery from causing the risk of lithium precipitation in the traction battery after the charging apparatus establishes a connection to the traction battery in a subsequent charging process of the traction battery, which will further improve the safety performance of the traction battery.

The specific embodiments of the battery charging method provided in the present application are described above with reference to FIG. 2 to FIG. 8. The specific embodiments of the related apparatus provided in the present application are described with reference to FIG. 9 and FIG. 10. It may be understood that for the related description in the various apparatus embodiments, reference may be made to the above method embodiments, and for the sake of brevity, details are not repeated herein.

Figure 9:
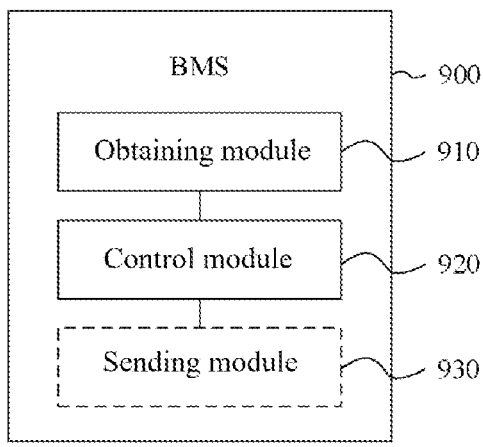
FIG. 9 is a schematic block diagram of a structure of a battery management system according to an embodiment of the present application.

FIG. 9 is a schematic block diagram of a structure of a battery management system BMS 900 according to an embodiment of the present application. As shown in FIG. 9, the BMS 900 includes: an obtaining module 910 and a control module 920.

In an embodiment of the present application, the obtaining module 910 is configured to obtain a state of health SOH of a traction battery, and the obtaining module 910 is further configured to: in a charging process of the traction battery, obtain a state of charge SOC of the traction battery. The control module 920 is configured to determine an SOC interval value corresponding to discharging or stopping being charged of the traction battery based on the SOH of the traction battery; and when the SOC of the traction battery changes by the SOC interval value, control the traction battery to discharge.

In an embodiment of the present application, the control module 920 is configured to: if the SOH of the traction battery is greater than or equal to a preset SOH threshold, determine that the SOC interval value is a first SOC interval value; and if the SOH of the traction battery is less than the preset SOH threshold, determine that the SOC interval value is a second SOC interval value, where the first SOC interval value is greater than the second SOC interval value.

In an embodiment of the present application, the control module 920 is configured to: determine the SOC interval value corresponding to the discharging or the stopping being charged of the traction battery based on the SOH and the SOC of the traction battery.

In an embodiment of the present application, the control module 920 is configured to: if the SOH of the traction battery is greater than or equal to the preset SOH threshold, and the SOC of the traction battery is less than a preset SOC threshold, determine that the SOC interval value is a third SOC interval value; if the SOH of the traction battery is greater than or equal to the preset SOH threshold, and the SOC of the traction battery is greater than or equal to the preset SOC threshold, determine that the SOC interval value is a fourth SOC interval value; if the SOH of the traction battery is less than the preset SOH threshold, and the SOC of the traction battery is less than the preset SOC threshold, determine that the SOC interval value is a fifth SOC interval value; and if the SOH of the traction battery is less than the preset SOH threshold, and the SOC of the traction battery is greater than or equal to the preset SOC threshold, determine that the SOC interval value is a sixth SOC interval value, where the third SOC interval value is greater than the fourth SOC interval value, and the fifth SOC interval value is greater than the sixth SOC interval value.

In an embodiment of the present application, the preset SOH threshold ranges from 80% to 99%.

In an embodiment of the present application, the control module 920 is configured to: determine the SOC interval value corresponding to the discharging or the stopping being charged of the traction battery based on the SOH of the traction battery and a preset mapping relationship.

In an embodiment of the present application, the SOC interval value ranges from 3% to 95%.

Optionally, as shown in FIG. 9, the BMS 900 provided in this embodiment of the present application may further include a sending module 930. In an embodiment of the present application, the sending module 930 is configured to send charging demand information, where a current demand value carried in the charging demand information is zero, and the charging demand information is used to control the traction battery to stop being charged.

In an embodiment of the present application, the obtaining module 910 is further configured to: obtain a current of the traction battery; and the control module 920 is configured to: when the current of the traction battery is less than or equal to a preset current threshold, control the traction battery to discharge.

In an embodiment of the present application, the control module 920 is configured to: when the discharging time of the traction battery is greater than or equal to a first preset time threshold or a time elapsed after the charging demand information is sent is greater than or equal to a second preset time threshold, control the traction battery to stop discharging.

Figure 10:
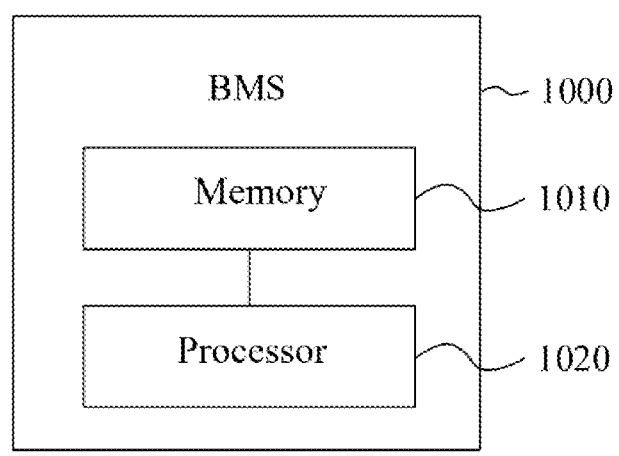
FIG. 10 is a schematic block diagram of a structure of a battery management system according to an embodiment of the present application.

FIG. 10 is a schematic block diagram of a structure of a BMS 1000 according to another embodiment of the present application. As shown in FIG. 10, the BMS 1000 includes a memory 1010 and a processor 1020, where the memory 1010 is configured to store a computer program, and the processor 1020 is configured to read the computer program and perform the methods of the above embodiments of the present application based on the computer program.

In addition, an embodiment of the present application further provides a readable storage medium configured to store a computer program, where the computer program is used to perform the methods of the above embodiments of the present application. Optionally, the computer program may be a computer program in the above BMS.

It should be understood that specific examples herein are only intended to help those skilled in the art better understand the embodiments of the present application, rather than limit the scope of the embodiments of the present application.

It should also be understood that in various embodiments of the present application, the sequence numbers of the processes do not mean the order of execution, and the execution order of the processes should be determined by their functions and internal logic, and should not be construed to limit the implementation processes of the embodiments of the present application in any way.

It should also be understood that the various implementations described in this specification may be implemented alone or in combination, which is not limited in the embodiments of the present application.

Although the present application has been described with reference to the preferred embodiments, various improvements may be made to the present application without departing from the scope of the present application and parts thereof may be replaced with equivalents. In particular, the technical features mentioned in the embodiments can be combined in any manner, provided that there is no structural conflict. The present application is not limited to the specific embodiments disclosed herein but includes all the technical solutions that fall within the scope of the claims.

The invention claimed is:

1. A method for charging a traction battery, applied to a battery management system BMS of the traction battery, wherein the method comprises:
   obtaining a state of health SOH of the traction battery;
   in a charging process of the traction battery, obtaining a state of charge SOC of the traction battery;
   determining an SOC interval value corresponding to discharging or stopping being charged of the traction battery based on the SOH of the traction battery; and
   when the SOC of the traction battery changes by the SOC interval value, controlling the traction battery to discharge or stop being charged,
   the SOH is a ratio of a current available capacity to a nominal capacity of the traction battery, the SOC is a ratio of a current remaining capacity to the current available capacity of the traction battery,
   the SOC interval value corresponding to the discharging or the stopping being charged of the traction battery is determined based on a mapping formula C %=$k_1 \times$H %+$b_1$, or C %=$k_2 \times$(H %)$^2$+$b_2$, wherein the SOC interval value is represented by C %, the SOH is represented by H %, and $k_1$, $k_2$, $b_1$, and $b_2$ are preset constants,
   the determining an SOC interval value corresponding to discharging or stopping being charged of the traction battery is based on the SOH of the traction battery and comprises:
      comparing the SOH of the traction battery with a series of preset SOH thresholds comprising a first preset SOH threshold that is 100%, a second preset SOH threshold that is less than the first SOH threshold, and a third SOH threshold that is less than the second SOH threshold;
      if the SOH of the traction battery is greater than or equal to the first preset SOH threshold, determining that the SOC interval value is a first SOC interval value, wherein the first SOC interval value is equal to a first preset SOC interval value corresponding to the first preset SOH threshold; and
      if the SOH of the traction battery is less than the first preset SOH threshold and greater than or equal to the second SOH threshold, determining that the SOC interval value is a second SOC interval value, wherein the second SOC interval value is less than the first preset SOC interval value corresponding to the first preset SOH threshold and greater than a second preset SOC interval value corresponding to the second preset SOH threshold,
      if the SOH of the traction battery is less than the second preset SOH threshold and greater than or equal to the third SOH threshold, determining that the SOC interval value is a third SOC interval value, wherein the third SOC interval value is less than the second SOC interval value and greater than or equal to a third preset SOC interval value corresponding to the third SOH threshold,
   wherein the first SOC interval value is greater than the second SOC interval value.

2. The method according to claim 1, wherein the determining the SOC interval value corresponding to the discharging or the stopping being charged of the traction battery is based on the SOH and the SOC of the traction battery and further comprises:
   when the SOH of the traction battery is greater than or equal to one preset SOH threshold of the series of preset thresholds, and the SOC of the traction battery is less than a preset SOC threshold corresponding to the SOH threshold, determining that the SOC interval value is a third SOC interval value;
   when the SOH of the traction battery is greater than or equal to the preset SOH threshold, and the SOC of the traction battery is greater than or equal to the preset SOC threshold, determining that the SOC interval value is a fourth SOC interval value;
   when the SOH of the traction battery is less than the preset SOH threshold, and the SOC of the traction battery is less than the preset SOC threshold, determining that the SOC interval value is a fifth SOC interval value; and
   when the SOH of the traction battery is less than the preset SOH threshold, and the SOC of the traction battery is greater than or equal to the preset SOC threshold, determining that the SOC interval value is a sixth SOC interval value,
   wherein the third SOC interval value is greater than the fourth SOC interval value, and the fifth SOC interval value is greater than the sixth SOC interval value.

3. The method according to claim 1, wherein the second preset SOH threshold ranges from 80% to 99%.

4. The method according to claim 1, wherein the determining an SOC interval value corresponding to discharging or stopping being charged of the traction battery based on the SOH of the traction battery comprises:
   determining the SOC interval value corresponding to the discharging or the stopping being charged of the traction battery based on the SOH of the traction battery and a preset mapping relationship.

5. The method according to claim 1, wherein the SOC interval values range from 3% to 95%.

6. The method according to claim 1, wherein before the controlling the traction battery to discharge, the method further comprises:
   sending charging demand information, wherein a current demand value carried in the charging demand information is zero, and the charging demand information is used to control the traction battery to stop being charged.

7. The method according to claim 6, wherein before the controlling the traction battery to discharge, the method further comprises:
   obtaining a current of the traction battery; and
   the controlling the traction battery to discharge comprises:

when the current of the traction battery is less than or equal to a preset current threshold, controlling the traction battery to discharge.

8. The method according to claim 6, wherein the method further comprises:
when a discharging time of the traction battery is greater than or equal to a first preset time threshold or a time elapsed after the charging demand information is sent is greater than or equal to a second preset time threshold, controlling the traction battery to stop discharging.

9. A battery management system BMS of a traction battery, comprising:
a processor:
a memory storing a computer program executable by the processor; and
an obtaining module, wherein the obtaining module is included in the computer program and configured to:
obtain a state of health SOH of the traction battery,
in a charging process of the traction battery, obtain a state of charge SOC of the traction battery; and
a control module, wherein the control module is included in the computer program and configured to:
determine an SOC interval value corresponding to discharging or stopping being charged of the traction battery based on the SOH of the traction battery;
when the SOC of the traction battery changes by the SOC interval value, control the traction battery to discharge or stop being charged,
wherein the SOH is a ratio of a current available capacity to a nominal capacity of the traction battery, the SOC is a ratio of a current remaining capacity to the current available capacity of the traction battery, the SOC interval value corresponding to the discharging or the stopping being charged of the traction battery is determined based on a mapping formula C %=$k_1$×H %+$b_1$, or C %=$k_2$×(H %)$^2$+$b_2$, wherein the SOC interval value is represented by C %, the SOH is represented by H %, and $k_1$, $k_2$, $b_1$, and $b_2$ are preset constants,
wherein the control module is further configured to:
compare the SOH of the traction battery with a series of preset SOH thresholds comprising a first preset SOH threshold that is 100%, a second preset SOH threshold that is less than the first SOH threshold, and a third SOH threshold that is less than the second SOH threshold,
when the SOH of the traction battery is equal to the first preset SOH threshold, determine that the SOC interval value is a first SOC interval value, wherein the first SOC interval value is equal to a first preset SOC interval value corresponding to the first preset SOH threshold; and
when the SOH of the traction battery is less than the first preset SOH threshold and greater than or equal to the second SOH threshold, determine that the SOC interval value is a second SOC interval value, wherein the second SOC interval value is less than the first preset SOC interval value corresponding to the first preset SOH threshold and greater than a second preset SOC interval value corresponding to the second preset SOH threshold,
when the SOH of the traction battery is less than the second preset SOH threshold and greater than or equal to the third SOH threshold, determining that the SOC interval value is a third SOC interval value,
wherein the third SOC interval value is less than the second preset SOC interval value and greater than or equal to a third preset SOC interval value corresponding to the third SOH threshold,
wherein the first SOC interval value is greater than the second SOC interval value.

10. The BMS according to claim 9, wherein the control module is further configured to:
determine the SOC interval value corresponding to the discharging or the stopping being charged of the traction battery based on the SOH and the SOC of the traction battery,
when the SOH of the traction battery is greater than or equal to one preset SOH threshold of the series of preset SOH thresholds, and the SOC of the traction battery is less than a preset SOC threshold corresponding to the preset SOH threshold, determine that the SOC interval value is a third SOC interval value;
when the SOH of the traction battery is greater than or equal to the preset SOH threshold, and the SOC of the traction battery is greater than or equal to the preset SOC threshold, determine that the SOC interval value is a fourth SOC interval value;
when the SOH of the traction battery is less than the preset SOH threshold, and the SOC of the traction battery is less than the preset SOC threshold, determine that the SOC interval value is a fifth SOC interval value; and
when the SOH of the traction battery is less than the preset SOH threshold, and the SOC of the traction battery is greater than or equal to the preset SOC threshold, determine that the SOC interval value is a sixth SOC interval value,
wherein the third SOC interval value is greater than the fourth SOC interval value, and the fifth SOC interval value is greater than the sixth SOC interval value.

11. The BMS according to claim 9, wherein the second preset SOH threshold ranges from 80% to 99%.

12. The BMS according to claim 9, wherein the control module is further configured to:
determine the SOC interval value corresponding to the discharging or the stopping being charged of the traction battery based on the SOH of the traction battery and a preset mapping relationship.

13. The BMS according to claim 9, wherein the computer program further comprises a sending module configured to send charging demand information, wherein a current demand value carried in the charging demand information is zero, and the charging demand information is used to control the traction battery to stop being charged.

14. The BMS according to claim 13, wherein the obtaining module is further configured to:
obtain a current of the traction battery; and
the control module is further configured to: when the current of the traction battery is less than or equal to a preset current threshold, control the traction battery to discharge.

15. The BMS according to claim 13, wherein the control module is further configured to:
when a discharging time of the traction battery is greater than or equal to a first preset time threshold or a time elapsed after the charging demand information is sent is greater than or equal to a second preset time threshold, control the traction battery to stop discharging.

* * * * *